United States Patent
Kato et al.

(10) Patent No.: US 9,465,571 B2
(45) Date of Patent: Oct. 11, 2016

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Masao Kato, Kawasaki (JP); Kiyoshi Umeda, Kawasaki (JP); Naoki Sumi, Kawasaki (JP); Tomohiro Suzuki, Tokyo (JP); Maya Kurokawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/730,985

(22) Filed: Jun. 4, 2015

(65) Prior Publication Data

US 2015/0363143 A1    Dec. 17, 2015

(30) Foreign Application Priority Data

Jun. 13, 2014 (JP) ................. 2014-122752

(51) Int. Cl.
*G06F 3/12* (2006.01)
*G06F 9/44* (2006.01)

(52) U.S. Cl.
CPC ........... *G06F 3/1292* (2013.01); *G06F 3/1214* (2013.01); *G06F 3/1224* (2013.01); *G06F 3/1247* (2013.01); *G06F 9/4443* (2013.01)

(58) Field of Classification Search
USPC ...... 358/1.15, 1.18, 1.13; 717/115; 715/863; 345/173
See application file for complete search history.

(56) References Cited

U.S. PATENT DOCUMENTS

| | | | | |
|---|---|---|---|---|
| 2006/0280362 | A1 | 12/2006 | Umeda | 382/167 |
| 2008/0068635 | A1* | 3/2008 | Asano | G06F 3/1204 358/1.13 |
| 2009/0324091 | A1 | 12/2009 | Hori | 382/199 |
| 2010/0303351 | A1 | 12/2010 | Umeda et al. | 382/167 |
| 2012/0026548 | A1 | 2/2012 | Nakagawa | 358/1.15 |
| 2015/0042580 | A1* | 2/2015 | Shim | G06F 3/017 345/173 |
| 2015/0067614 | A1* | 3/2015 | Jong | G06F 3/0483 715/863 |
| 2015/0363173 | A1* | 12/2015 | Kurokawa | H04L 67/02 717/115 |

FOREIGN PATENT DOCUMENTS

| | | |
|---|---|---|
| JP | 2006-350557 A | 12/2006 |
| JP | 2010-010938 A | 1/2010 |
| JP | 2010-278708 A | 12/2010 |
| JP | 2011-233034 A | 11/2011 |

OTHER PUBLICATIONS

T. Suzuki, U.S. Appl. No. 14/727,182, filed Jun. 1, 2015.

(Continued)

*Primary Examiner* — Jerome Grant, II
(74) *Attorney, Agent, or Firm* — Fitzpatrick, Cella, Harper & Scinto

(57) ABSTRACT

This invention provides an apparatus use environment with higher flexibility and convenience. To achieve this, based on information acquired by an apparatus on which a program including a first program layer with an instruction set to be interpreted and executed by a processor and a second program layer with an instruction set compiled in advance by a unit other than the processor operates, display contents of a display screen for using a function of the apparatus, which are displayed in the first program layer, are controlled.

19 Claims, 15 Drawing Sheets

(56) References Cited

OTHER PUBLICATIONS

K. Umeda, U.S. Appl. No. 14/728,265, filed Jun. 2, 2015.
K. Umeda, U.S. Appl. No. 14/743,487, filed Jun. 18, 2015.
N. Sumi, U.S. Appl. No. 14/743,459, filed Jun. 18, 2015.
M. Kurokawa, U.S. Appl. No. 14/722,452, filed May 27, 2015.
M. Obayashi, U.S. Appl. No. 14/741,973, filed Jun. 17, 2015.
F. Goto, U.S. Appl. No. 14/740,678, filed Jun. 16, 2015.
H. Kunieda, U.S. Appl. No. 14/740,752, filed Jun. 16, 2015.
Y. Mizoguchi, U.S. Appl. No. 14/741,958, filed Jun. 17, 2015.

* cited by examiner

F I G. 1
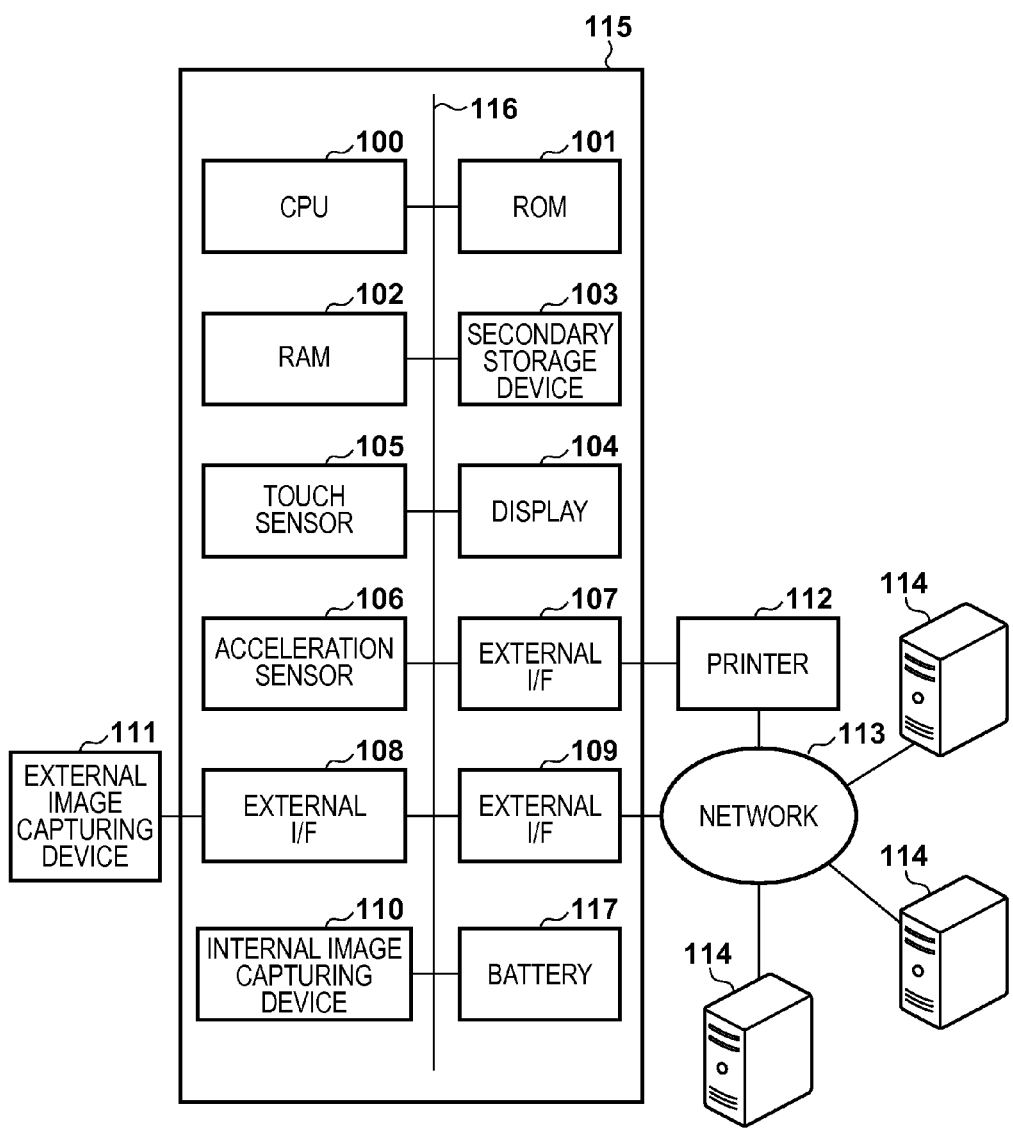

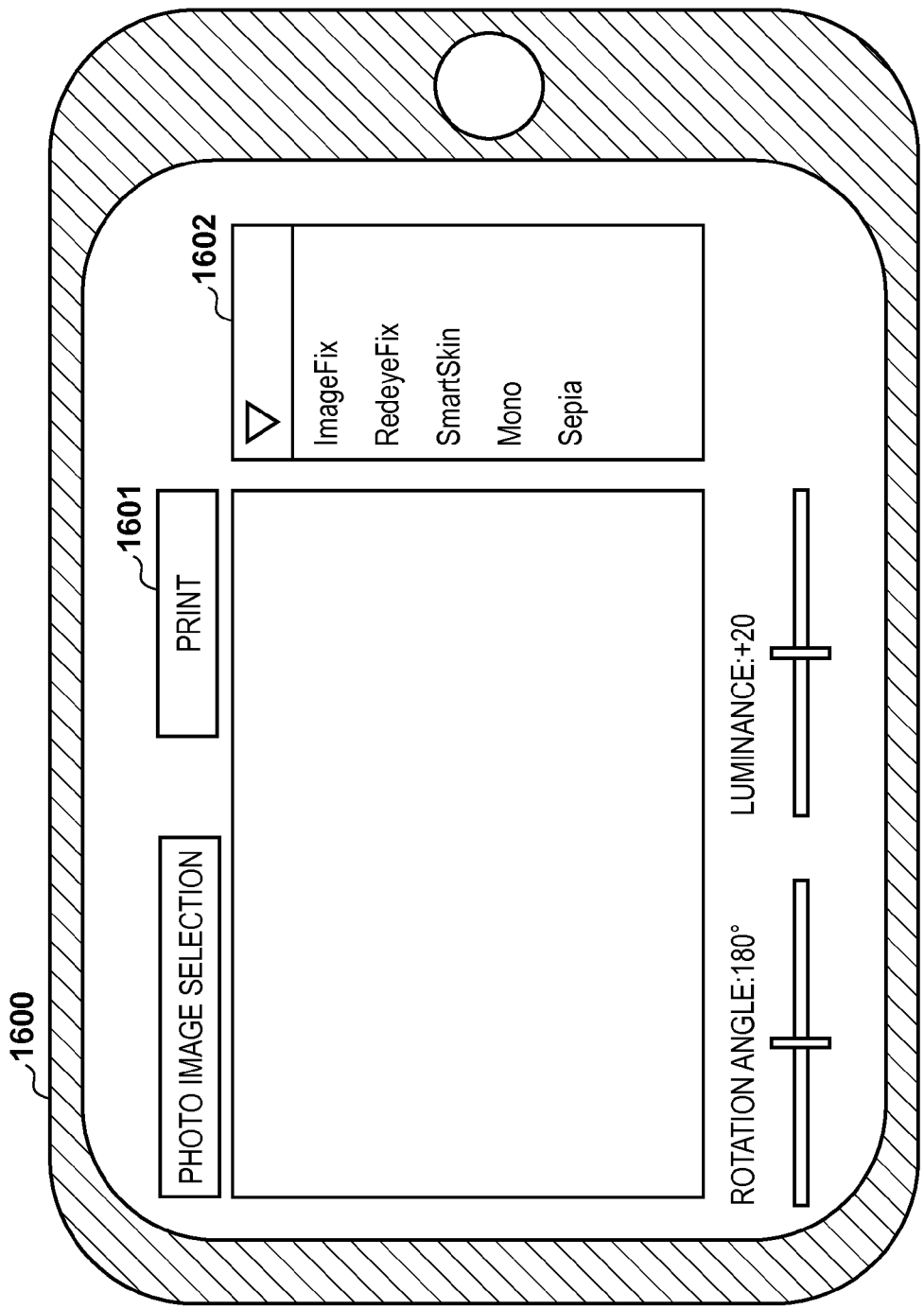

APPARATUS, METHOD, AND NON-TRANSITORY COMPUTER-READABLE STORAGE MEDIUM

BACKGROUND OF THE INVENTION

1. Field of the Invention

The present invention relates to control of a display screen provided by an apparatus which uses an external device.

2. Description of the Related Art

In recent years, portable multi-function terminals (to be referred to as mobile computers hereinafter) incorporating a camera function have become widespread, and far surpass digital cameras and conventional personal computers (to be referred to as PCs hereinafter) in sales.

Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and transformed from a so-called high-level language understandable by a human into instruction sets such as an assembler directly executable by the CPU of the computer. Thus, the general native application has an advantage that it is possible to perform an operation at high speed since the CPU directly executes instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

For example, Japanese Patent Laid-Open No. 2011-233034 discloses a technique of executing printing by a Web application operating on a Web Browser.

As described above, a recent mobile computer holds a camera of a high resolution. Since the mobile computer is carried every day, and includes a memory capable of storing about several thousand photos, the user can easily enjoy shooting a photo at a very high frequency. An application of performing filter processing of changing the shot image into a monochrome/sepia-toned image or image processing of correcting the brightness, color balance, and the like of the photo has become very important and essential to the user. When creating an application capable of readily providing such image processing to the user without any stress in each of the above two application forms, this may have the following advantages and disadvantages.

The native application has an advantage that it is possible to execute processing at high speed, as described above. However, it is necessary to develop the application using each development language different for each OS. This may increase the development cost and development time, thereby making it impossible to quickly provide the application to the user. Also, it is necessary to compile the native application in advance. Therefore, for example, it may be difficult to change the UI (User Interface) design of the application at the time of an operation, or dynamically add a function, resulting in a lack of flexibility.

As for the Web application, the main body of the Web application described in HTML5, CSS, or JavaScript generally exists on a server outside the mobile computer. Since the Web application is dynamically downloaded from the server to the mobile computer via an Internet line when using it, it is possible to dynamically change the UI design or the like without compiling the application in advance.

However, when executing advanced complex processing, there are only two choices about whether to execute the Web application on the browser by JavaScript or on the server under the security restrictions of the browser. Conventionally, JavaScript is described as a script of character strings perceivable by a human, and can be executed by compiling the script, as needed, at the time of operating the script. Consequently, if complex processing is described by JavaScript, the operation may be slowed down.

On the other hand, if the complex processing is executed by the server, the time is required to upload data such as photos existing in the mobile computer to the server via the Internet line, and download the result of the processing by the server from the server. In some cases, this arrangement cannot implement immediate processing with little stress on the mobile application.

In addition, the performances of mobile computers vary. For example, a given device has very high CPU performance equivalent to that of a personal computer of several years ago. On the other hand, a low-end mobile computer has low CPU performance. If such mobile computer executes advanced complex processing, the processing time for one image may be several ten sec, thereby significantly impairing the usability. The same applies to a memory. That is, a given device incorporates a memory of 2 to 3 GB, and can afford to hold image data of about 10 million pixels in the memory. However, a low-end device may be able to include a memory of only about 1 GB or less. In this case, it is difficult to hold high-resolution image data in the memory at once. It is desired to provide an optimum processing experience to the user in accordance with a terminal apparatus of different performance and its operation state.

At the zenith of the mobile computer which will come in the near future, it is desired to shorten the development period, and provide a versatile application form and development environment to the user.

SUMMARY OF THE INVENTION

The present invention has been made to solve the above problems, and provides an apparatus use environment with higher flexibility and convenience.

According to one aspect of the present invention, there is provided an apparatus for executing a predetermined function, comprising: a storage unit configured to store a program including a first program layer with an instruction set to be interpreted and executed by a processor and a second program layer with an instruction set compiled in advance by a unit other than the processor; and a display control unit configured to control, based on information acquired by the apparatus, display contents of a display screen for using the predetermined function of the apparatus, which are displayed in the first program layer of the program stored in the storage unit.

According to the present invention, it is possible to provide an apparatus use environment with higher flexibility and convenience.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of an information processing apparatus;

FIG. 16 is a view showing an example of a function selection screen.

DESCRIPTION OF THE EMBODIMENTS

Figure 2:
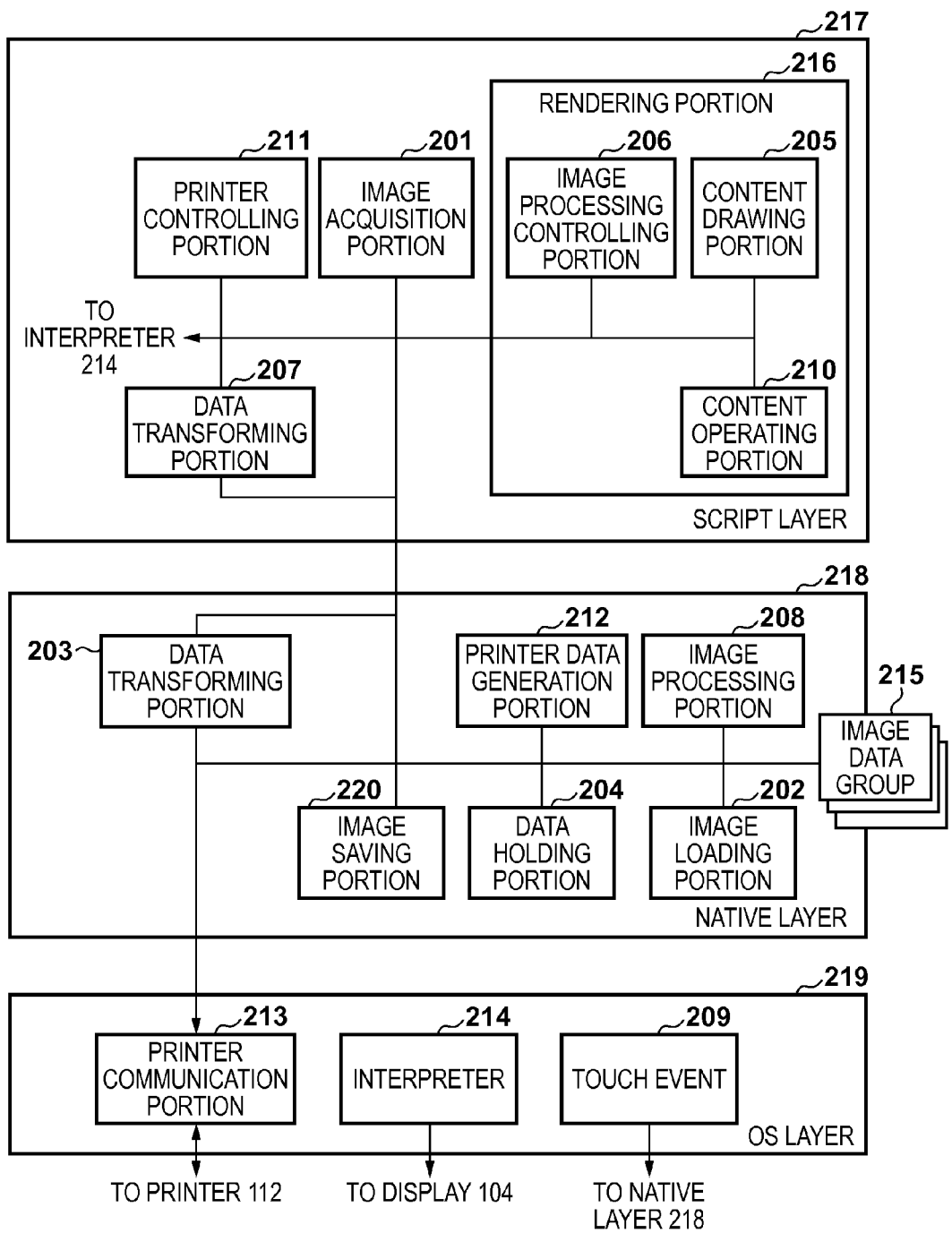
FIG. 2 is a block diagram showing the software arrangement of the information processing apparatus.

Embodiments of the present invention will be described in detail below with reference to the accompanying drawings.

First Embodiment

In this embodiment, an arrangement in which a hybrid application (to be described later) is operated on an information processing apparatus, various kinds of image processing are applied to an image selected by the user, and then the image is printed will be explained.

<Description of Hardware Arrangement>

FIG. 1 is a block diagram showing a portable information terminal such as a smartphone or portable telephone as an information processing apparatus 115. Referring to FIG. 1, a CPU (Central Processing Unit/Processor) 100 executes various kinds of processing (to be described below) according to a program. There is one CPU 100 in FIG. 1 but a plurality of CPUS or CPU cores may be included. A ROM 101 stores a program to be executed by the CPU 100. A RAM 102 is a memory for temporarily storing various kinds of information at the time of execution of the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of executed processing. The display 104 may include a touch sensor 105.

The information processing apparatus 115 may include an internal image capturing device 110. Image data captured by the internal image capturing device 110 undergoes predetermined image processing, and is then saved in the secondary storage device 103. Image data may be loaded from an external image capturing device 111 connected via an external I/F 108.

The information processing apparatus 115 includes an external I/F 109, and can perform communication via a network 113 such as the Internet. The information processing apparatus 115 can acquire, via the external I/F 109, image data from servers 114 connected to the network 113.

The information processing apparatus 115 includes an acceleration sensor 106, and can acquire acceleration information about the position and orientation of the information processing apparatus 115. The information processing apparatus 115 is connected to a printer 112 via an external I/F 107, and can output data such as image data. The printer 112 is also connected to the network 113, and can transmit/receive image data via the external I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth, infrared communication, or the like is used. If a wireless LAN is used for wireless communication, there are a mode in which apparatuses are directly connected to each other and a mode in which apparatuses are connected to each other via a relay apparatus such as a wireless LAN router. Although the external I/Fs 107 to 109 are arranged separately, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the execution location (software execution environment) of software such as a program executed by the controlling portion (CPU 100) of the information processing apparatus 115.

<Block Diagram of Software>

FIG. 2 is a block diagram showing the arrangement of software programs operating on the information processing apparatus 115.

The information processing apparatus 115 implements a program of a script layer 217, native layer 218, and OS layer 219. Each layer is implemented when the CPU 100 reads out and executes the corresponding program stored in the ROM 101 or secondary storage device 103.

The script layer 217 is a program layer in which an instruction set (drawing of a content, display of an image, playback of a moving image, and the like) is described by text data using a Web standard language such as HTML5, CSS3, or JavaScript. In this script layer 217, in an application execution environment, various instruction sets of text data are interpreted and executed using a processor (for example, the CPU 100) existing in the application execution environment. For example, there may be a form in which statements are dynamically interpreted line by line every execution operation, a form in which statements are interpreted when activating an application, and a form in which statements are interpreted when installing an application in the information processing apparatus 115.

Processing in the script layer 217 and its contents will be referred to as a script hereinafter. As an example of a form in which the instructions of the script are interpreted in the information processing apparatus 115, the interpreter function included in the native layer 218 or OS layer 219 is used. Note that in this embodiment, a large portion of the UI of the application is assumed to be described in the script layer 217.

The native layer 218 is a portion of executing an instruction set compiled in advance in an environment other than the application execution environment. In the native layer 218, a code described in a high-level language such as C or C++ is compiled in advance on the server or the PC of the developer of the application into an aggregate of instructions interpretable by the CPU 100. Processing in the native layer 218 and its contents, and calling of the function of the OS layer 219 (to be described later) from the native layer 218 will be referred to as "native" hereinafter. Note that an example of another implementation system of the native layer 218 is Java. Java is a high-level language similar to C/C++, and is compiled in advance into an intermediate code in the development environment at the time of development of the application. The compiled intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing calling of the native layer 218 from the script layer 217 will be referred to as "binding" or "bind". The native layer includes an API, and the various functions of the native layer can be used when the API calls the script. In general, this binding function is normally included in each of various OSs.

Note that in this embodiment, the application including the script layer 217 and native layer 218 will be referred to as a hybrid application.

An image acquisition portion 201 of the script layer 217 requests the native layer 218 to acquire image data. At the time of the acquisition request, the image acquisition portion 201 generates a unique ID, and transmits it to the native layer 218. This ID and the image data loaded by an image loading portion 202 of the native layer 218 are stored in a pair in a data holding portion 204 of the native layer 218. In addition, for example, a method of designating an absolute path, a method of prompting display of a dialog, or the like can be used.

The image loading portion 202 of the native layer 218 acquires the image data from an image data group 215. A method of acquiring the image data from the image data group 215 depends on the request of the image acquisition portion 201 of the script layer 217. The request method may be selected from a dialog box provided on the UI, or an image may be directly selected based on the path of a file.

A data transforming portion 203 of the native layer 218 transforms data in the native layer 218 into data in a format usable in the script layer 217. On the other hand, the data transforming portion 203 also transforms data sent from the script layer 217 into a format usable in the native layer 218.

A data transforming portion 207 of the script layer 217 transforms data in the script layer 217 into data in a format usable in the native layer 218. On the other hand, the data transforming portion 207 also transforms data sent from the native layer 218 into a format usable in the script layer 217.

The data holding portion 204 of the native layer 218 holds the image data loaded by the image loading portion 202 and image data having undergone image processing by an image processing portion 208. The held image data is rasterized into, for example, an RGB image signal, and has a format in which it is possible to immediately execute image processing. The held image data is paired with the ID generated by the image acquisition portion 201 of the script layer 217. Thus, it is possible to acquire the corresponding image data from the data holding portion 204 by designating the ID.

A content drawing portion 205 of the script layer 217 displays, on the display 104, the image data acquired via the data transforming portion 203 of the native layer 218. The content drawing portion 205 re-draws image data operated by a content operating portion 210. The content operating portion 210 operates the image data in the script layer 217. Examples of this operation are enlargement, movement, and rotation of the image data. The content drawing portion 205 describes a content to be printed by using a Web standard language. The script operated by the content operating portion 210 is also reflected on the description. The script of the content described by the content drawing portion 205 is interpreted by an interpreter 214 of the OS layer 219, and displayed on the display 104.

An image processing controlling portion 206 decides a correction parameter to be used for image processing, and requests the image processing portion 208 of the native layer 218 to perform image processing. First, the image processing controlling portion 206 sets a correction parameter in the script layer 217. In the data transforming portion 207, the set correction parameter is transformed into a format transmittable to the native layer 218. The transformed correction parameter is then transmitted to the native layer 218 together with the ID of image data to be processed.

The image processing portion 208 of the script layer 217 acquires an image corresponding to the ID designated by the image processing controlling portion 206 from the data holding portion 204 of the native layer 218, and performs image processing. At this time, image processing to be performed is decided based on the correction parameter set by the image processing controlling portion 206.

A touch event 209 of the OS layer 219 acquires information about a touch of the display 104. The information about a touch includes, for example, touch detection of the display 104 and touched position information. The acquired information about a touch is transmitted to the content operating portion 210 of the script layer 217 via the native layer 218.

A printer controlling portion 211 of the script layer 217 controls a rendering start request to a rendering portion 216, a printer detection request, display of a printer setting screen, and generation and transmission of print information. In the printer setting screen, printer settings such as a paper size, paper type, and color/monochrome are made. A printer data generation portion 212 generates printer data based on the items set in the printer setting screen.

Based on the request from the printer controlling portion 211, the printer data generation portion 212 generates a command and data necessary for printer communication. The data necessary for printer communication is data complying with a communication protocol, and the command is data for deciding the operation of the printer such as printing or scanning.

A printer communication portion 213 of the OS layer 219 transmits the printer data received from the printer data generation portion 212 to the connected printer 112, and receives information about the printer 112 from the printer 112. The interpreter 214 of the OS layer 219 interprets/executes an instruction generated in the script layer 217. For example, an instruction of drawing an image or the like is executed via the interpreter 214 and displayed on the display 104.

The image data group 215 is an area which holds image data. An image saving portion 220 saves image data held in the data holding portion 204 in the image data group 215, as needed.

The rendering portion 216 controls the content drawing portion 205, image processing controlling portion 206, and content operating portion 210 to render the image data to be processed. This rendering operation includes, for example, generation of an image of an output resolution in the script layer 217. At this time, neither the rendering result nor the image currently generated is displayed on the display 104. The rendering result is transmitted to the data transforming portion 203 of the native layer 218, and transformed into image data in a format usable by the printer 112.

<Processing Associated with User Operation>

Figure 3:
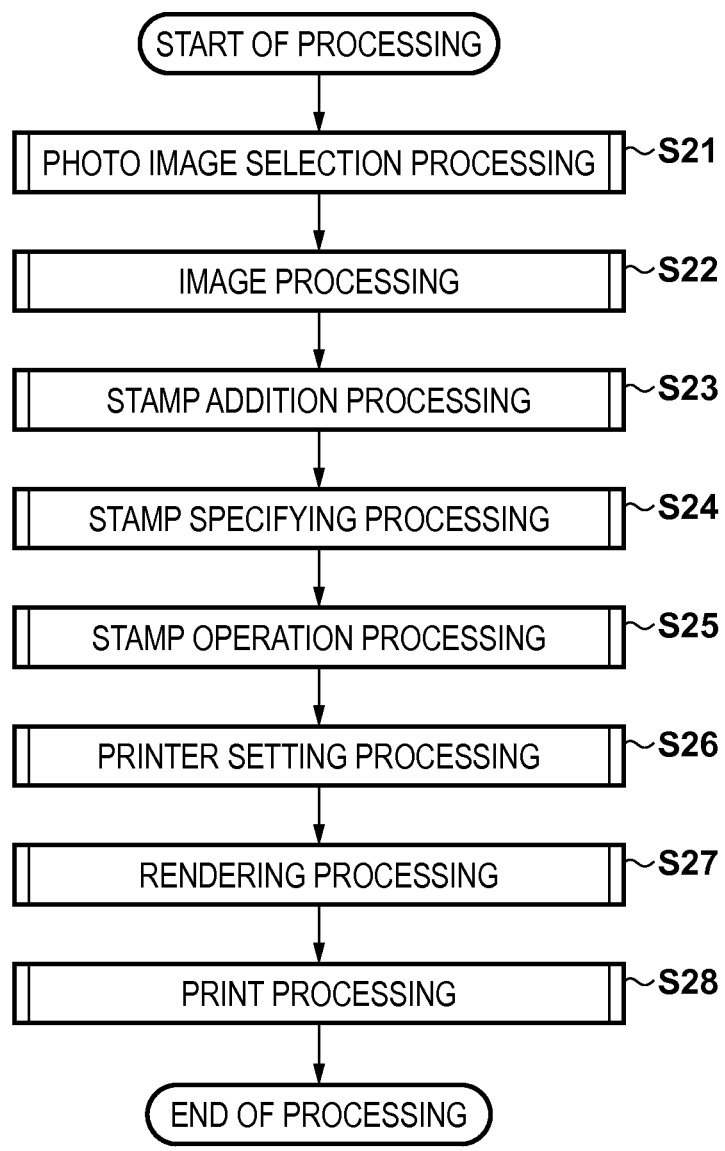
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. The processing shown in FIG. 3 is implemented when the CPU 100 of the information processing apparatus 115 executes a program stored in the ROM 101 or secondary storage device 103. Each step shown in FIG. 3 transits according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation, the same shall apply hereinafter) on a photo image selection button 1201 of the application screen 1200, the CPU 100 selects an arbitrary image in accordance with the operation. After the image is selected, the CPU 100 displays the selected image on an entire drawing area 1206 of the application screen 1200.

In step S22, upon detecting a user operation on a slide bar 1202 for adjusting the luminance of the displayed image, the CPU 100 sets a correction parameter to be used for image processing in accordance with the user operation. The CPU 100 performs the image processing for the displayed image according to the set correction parameter, and displays processing contents and a processing result in the drawing area 1206.

In step S23, upon detecting a user operation on a stamp addition button 1203, the CPU 100 displays a stamp list 1207. Upon detecting selection of a stamp by a user operation on the stamp list 1207, the CPU 100 adds/displays the selected stamp in the drawing area 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation on a slide bar 1204 for rotating the stamp in the operation acceptance status, the CPU 100 rotates the stamp in the operation acceptance status as a stamp operation in accordance with the user operation.

In step S26, upon detecting a user operation on a print button 1205, the CPU 100 displays a setting screen 1301 (FIG. 13) for setting information necessary for printing. The information necessary for printing includes, for example, a paper size, paper type, print quality, bordered/borderless setting item, as shown in the setting screen 1301 of FIG. 13. In addition, settable setting items such as double-sided/single-sided and monochrome/color are provided depending on the functions of the printer to be used.

In step S27, upon detecting a user operation on a setting completion button 1302 of the setting screen 1301, the CPU 100 executes rendering to transform the image displayed in the drawing area into a print resolution for output to the printer.

In step S28, the CPU 100 transmits the image transformed into the print resolution to the printer 112 together with a printer control command to print the image by the printer 112.

Note that minimum steps are indicated in the processing shown in FIG. 3 for the sake of simplicity. However, processing contents are not limited to them, and the processing order of the steps is not limited to this. In this embodiment, the first program layer including an instruction set to be interpreted and executed by the processor is defined as the script layer 217, and the second program layer including an instruction set compiled in advance by a portion other than the processor is defined as the native layer 218. A program including the first program layer and the second program layer implements a hybrid application. Character string data is defined as the first format and binary data is defined as the second format.

<Selection of Printer>

First, when an application for implementing the processing shown in FIG. 3 is activated by a user operation, the application performs discovery processing (not shown) of a connectable external device (the printer 112). The discovery processing indicates processing of specifying the IP address of the connectable printer 112 in the network 113 in which the information processing apparatus 115 exists.

The information processing apparatus 115 can transmit an instruction to acquire attribute information of various printers to the IP address (in some cases, a plurality of IP addresses) acquired by the discovery processing, and acquires a reply.

More specifically, in the native layer 218, the information processing apparatus 115 generates a command for acquiring information of each printer. The command is an instruction to designate the operation of the printer, and expressed in XML given by:

```
<?xml version="1.0" encoding="utf-8" ?>
<cmd xmlns:trans="http://www.trans/example/">
    <contents>
        <operation>GetInformation</operation>
    </contents>
</cmd>
```

The generated command is broadcast to network devices (for example, routers connected by Wi-Fi®) on the network in a format complying with the communication protocol of the printer. The communication method may be a Wi-Fi Direct mode or a mode of using a telephone line. The present invention, however, is not limited to them. As a result of transmitting the command, the native layer 218 receives a response from the printer. The received response is exemplarily expressed in XML given by:

```
<?xml version="1.0" encoding="utf-8" ?>
<cmd xmlns:trans="http://www.trans/example/">
    <contents>
        <PrinterName>PrinterA</PrinterName>
        <ImageProcGrp>A</ImageProcGrp>
    </contents>
</cmd>
```

The simple example is shown above. By using the PrinterName tag, a printer name can be acquired. Furthermore, by using the ImageProcGrp tag, an image processing group usable by each printer can be acquired.

A model name acquired in the native layer 218 can be transmitted to the script layer 217, thereby displaying a list of printers by a virtual code given by:

```
<form name="frmPrinter">
    <select name="selPrinter">
    </select>
</form>
<script type="text/javascript">
    Function fAddPrinter(PrinterName, count) {
        var
sObj=document.forms["frmPrinter"].elements["selPrinter"];
        for (var i=0; i<count; i++){
            var idx=sObj.length;
            sObj.options[idx]=new Option(PrinterName[i]);
        }
    }
</script>
```

The select tag is a description for displaying the list. The JavaScript code described in the script tag allows addition of acquired printer names (which are stored as the PrinterName array) to the list.

Figure 15:
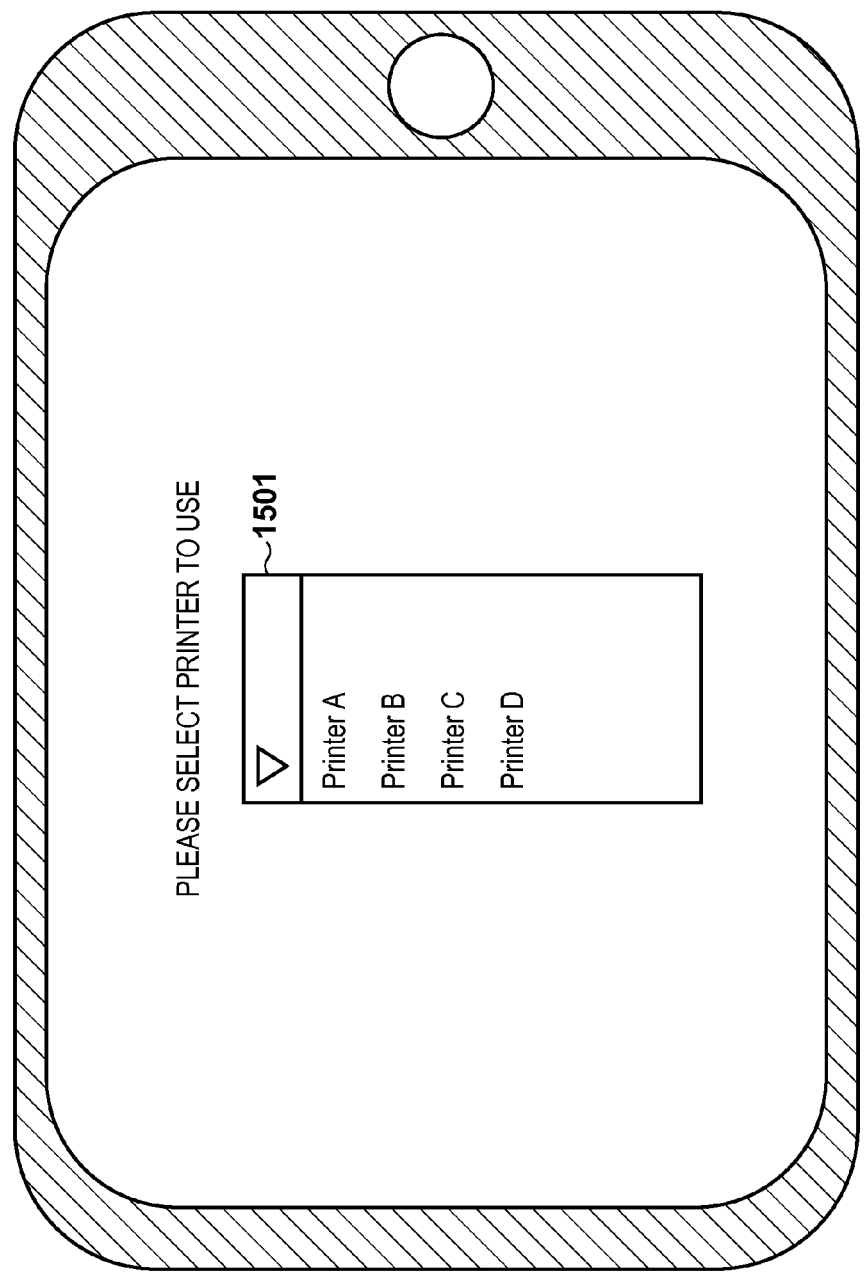
FIG. 15 is a view showing an example of a function selection screen.

FIG. 15 shows a pull-down menu 1501 including the list of printers which is displayed on the display 104 by interpreting, by the interpreter 214, the virtual code generated in the script layer 217. When the user selects a desired printer, an ID indicating the ordinal number of the list can be acquired. After selecting the printer, the user transits to an operation of selecting a photo image.

<Details of Photo Image Selection Processing>

Figure 4:
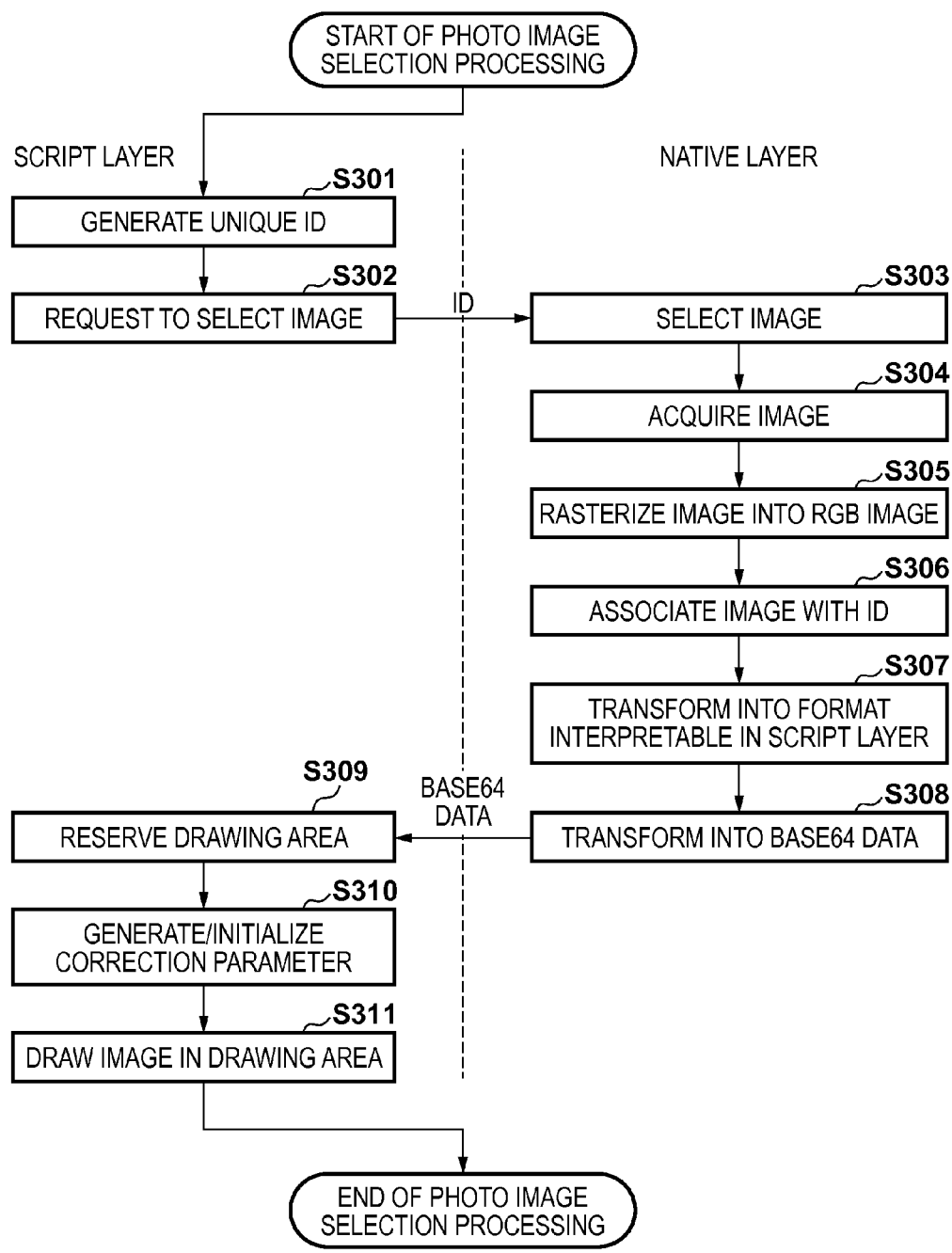
FIG. 4 is a flowchart illustrating details of photo image selection processing.

Details of the photo image selection processing in step S21 of FIG. 3 will be described with reference to FIG. 4.

In step S301, the CPU 100 generates a unique ID in the script layer 217. This ID may have any form such as a numerical value or character string as long as it can be transmitted from the script layer 217 to the native layer 218. In step S302, in the script layer 217, the CPU 100 requests the native layer 218 to select an image in accordance with a user operation on the photo image selection button 1201 together with the generated ID. As a request method, the binding function is used to call an image selection API unique to the native layer 218 from the script layer 217. A function capable of being directly called from the script layer 217 or a so-called wrapper of indirectly calling the function is prepared in advance in the native layer 218.

In step S303, in the native layer 218, the CPU 100 displays a device-specific image selection UI on the display 104. Based on a user operation on the displayed image selection UI, one arbitrary image is selected. In the image selection processing, for example, one image is selected from a folder managed in the information processing apparatus 115. The present invention, however, is not limited to this. For example, an image on the Internet or an image in a detachable storage medium may be selected, or an image shot using the internal image capturing device 110 of the information processing apparatus 115 may be acquired.

In step S304, in the native layer 218, the CPU 100 acquires the selected image. If, for example, the selected image is in the form of an image file, the CPU 100 opens the file, and reads out its contents. In step S305, in the native layer 218, the CPU 100 rasterizes the acquired image into an RGB image. In step S306, in the native layer 218, the CPU 100 holds the rasterized RGB image in the data holding portion 204 in association with the ID acquired from the script layer 217. As an association method, for example, an object having the ID and RGB image is created to make it possible to specify the RGB image by the ID. An association method is not limited to this, and a path as the access destination of the ID and the selected image, a function or class to be executed in accordance with the ID and RGB rasterization, and the like can be used.

In step S307, in the native layer 218, the CPU 100 transforms the rasterized RGB image into data in a format interpretable in the script layer 217. In this embodiment, the transformed data format is JPEG (Joint Photography Expert Group). In step S308, in the native layer 218, the CPU 100 transforms the data in the JPEG format into base64 data, and transmits the base64 data to the script layer 217. This is done because the data array of the RGB image cannot be used intact in the script layer 217, and it is thus necessary to transform, in the native layer 218, the data array into a format usable in the script layer 217. Since only a character string can be used in JavaScript®, the base64 format which represents data as a character string is used in this embodiment.

In step S309, in the script layer 217, the CPU 100 receives the base64 data transformed in the native layer 218, and reserves a drawing area for displaying the base64 data in the RAM 102. In this embodiment, as an example of reserving the drawing area, the HTML canvas function is used, and the API of the Context object of a canvas is used to draw an image.

In step S310, in the script layer 217, the CPU 100 generates and initializes a correction parameter. The correction parameter is an object holding parameters for deciding contents of the image processing in step S22. An example of the correction parameter held by JavaScript® is:

```
var CorrectionParam=function( ){
    this.brightness = 0;
}
```

This correction parameter represents that a variable "brightness" is provided for brightness correction in a CorrectionParam object and a value of 0 is stored.

In this embodiment, for the sake of simplicity, the correction parameter only for brightness (luminance) correction is used. However, parameters (the intensity of a blur filter, ON/OFF of a sepia transform, and the like) for other correction processes may be added.

In step S311, in the script layer 217, the CPU 100 designates base64 data as data to be drawn in the drawing area, thereby drawing an image in the drawing area according to the designation. More specifically, the interpreter 214 interprets the script of the base64 data, and displays it as an image in the drawing area. An example of a sample code of reflecting the base64 data on the drawing area is:

```
var base64Data = base64 data from native layer
var canvas = document.createElement("canvas");
//reserve the drawing area of an image
canvas.setAttribute("width", 100);        //set the
size of the drawing area
canvas.setAttribute("height", 100);
var context = canvas.getContext("2d");   //generate an
object having an API to be drawn in the drawing area
var img = new Image( );       //generate an Image object
img.src = base64Data;       //set the received base64
data as the URI of the image
img.onload = function( ){   //start processing after the
end of loading of the image
context.drawImage(img, 0, 0, img.width, img.height, 0,
0, canvas.width, canvas.height);  //draw the image in
the drawing area using a method of a context object
document.getElementById("div").appendChild(canvas);
//This flowchart assumes a layer structure of many
canvases. These canvases do not freely exist
everywhere, and drawing, moving, and enlargement
operations are performed within a specific area (the
drawing area 1206 of Fig. 12). The area is designated
by "div", and each canvas is added to "div".
}
```

<Details of Image Processing>

Figure 5:
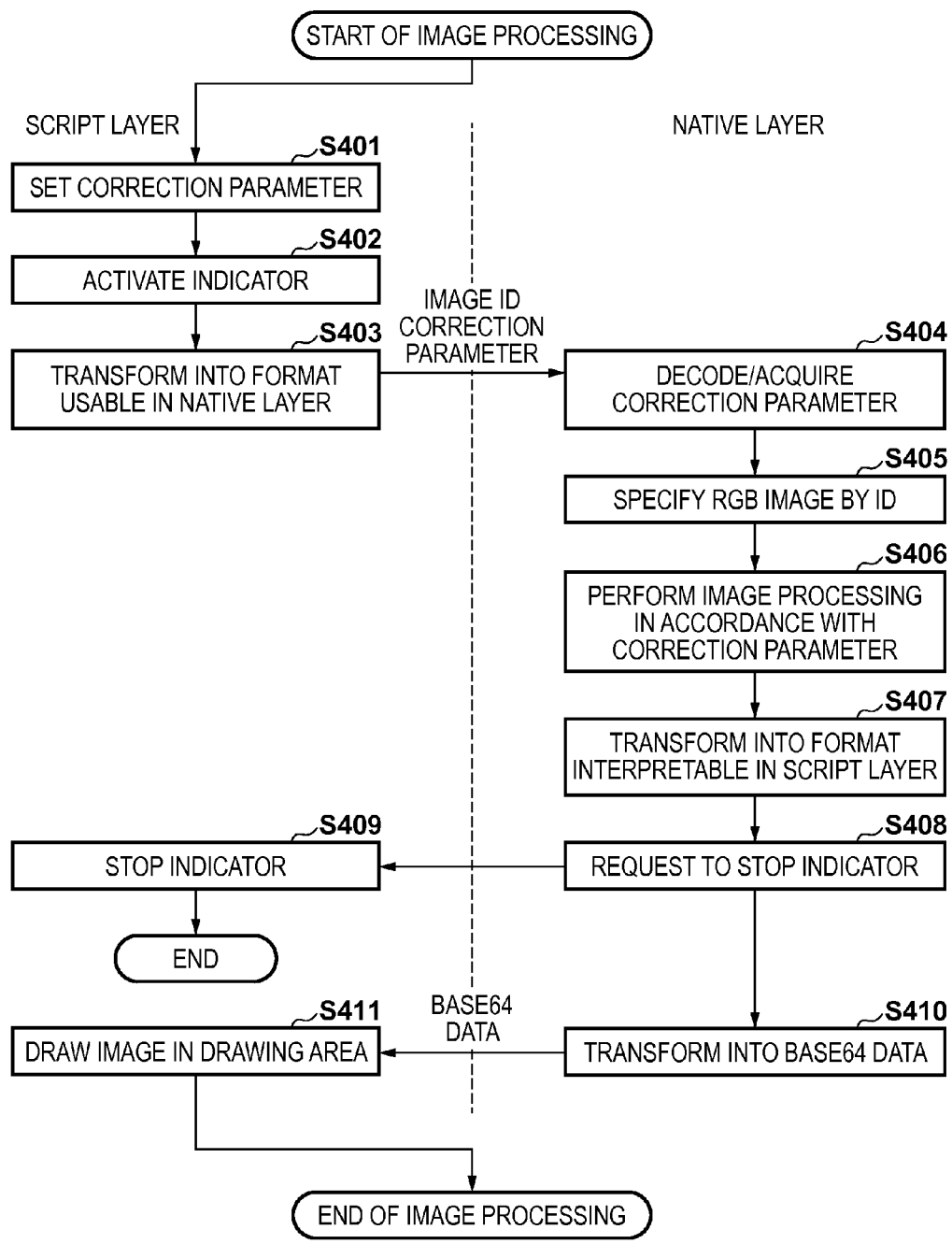
FIG. 5 is a flowchart illustrating details of image processing.

Details of the image processing in step S22 of FIG. 3 will be described with reference to FIG. 5.

In step S401, in the script layer 217, the CPU 100 sets the correction parameter. In this example, the CPU 100 updates the value of "brightness" of the correction parameter generated in step S310 of FIG. 3 by a value set in accordance with a user operation on the slide bar 1202. In step S402, in the script layer 217, the CPU 100 activates an indicator, and displays it on the display 104. The indicator is displayed to notify the user that the processing is in progress, and is generally represented by a progress bar, a clock mark, or an image such as flickering or rotation of a figure. In step S403, in the script layer 217, the CPU 100 transforms the set correction parameter into a format usable in the native layer 218. In this example, the correction parameter is in the form of an object, and cannot be used intact in the native layer 218. Thus, the CPU 100 transforms the set correction parameter into a JSON character string. The CPU 100 transmits the correction parameter transformed into the JSON character string to the native layer 218 together with the ID generated in step S301 of FIG. 3.

In step S404, in the native layer 218, the CPU 100 decodes the correction parameter transformed into the JSON character string, thereby acquiring the correction parameter. More specifically, the correction parameter is parsed using a parser included in the OS layer 219. In the above example, after the parsing processing, "brightness" of the correction parameter is acquired.

In step S405, in the native layer 218, the CPU 100 specifies the RGB image rasterized in step S305 of FIG. 3 based on the ID acquired from the script layer 217. Note that association between the ID and the image is not limited to paring the ID and the RGB image, as described above. For example, a method of associating the path of the image with the ID may be used. There are various examples to be associated with the ID, such as an object of the native layer 218, the first address of image data, and a function of calling the image.

In step S406, in the native layer 218, the CPU 100 determines image processing to be performed based on the acquired correction parameter, and performs the image processing for the RGB image. In this embodiment, a value of 10 is added to the R, G, and B values of all pixels according to the brightness correction parameter.

In step S407, in the native layer 218, the CPU 100 transforms the RGB image having undergone the image processing into data in a format interpretable in the script layer 217. In this example, the CPU 100 transforms the RGB image into data in the JPEG format, similarly to step S307 of FIG. 3. In step S408, in the native layer 218, the CPU 100 requests the script layer 217 to stop the indicator. This is implemented by calling an indicator stop function defined in the script layer 217 from the native layer 218.

In step S409, in the script layer 217, the CPU 100 stops the indicator, and removes the indicator displayed on the display 104.

On the other hand, in step S410, in the native layer 218, the CPU 100 transforms the transformed data in the JPEG format into base64 data, and transmits the base64 data to the script layer 217.

In step S411, in the script layer 217, the CPU 100 receives the base64 data transformed in the native layer 218, and draws an image in the drawing area reserved in step S309 of FIG. 3 in accordance with the base64 data. When this image is interpreted in the OS layer 219, it is displayed in the designated display area.

Figure 14:
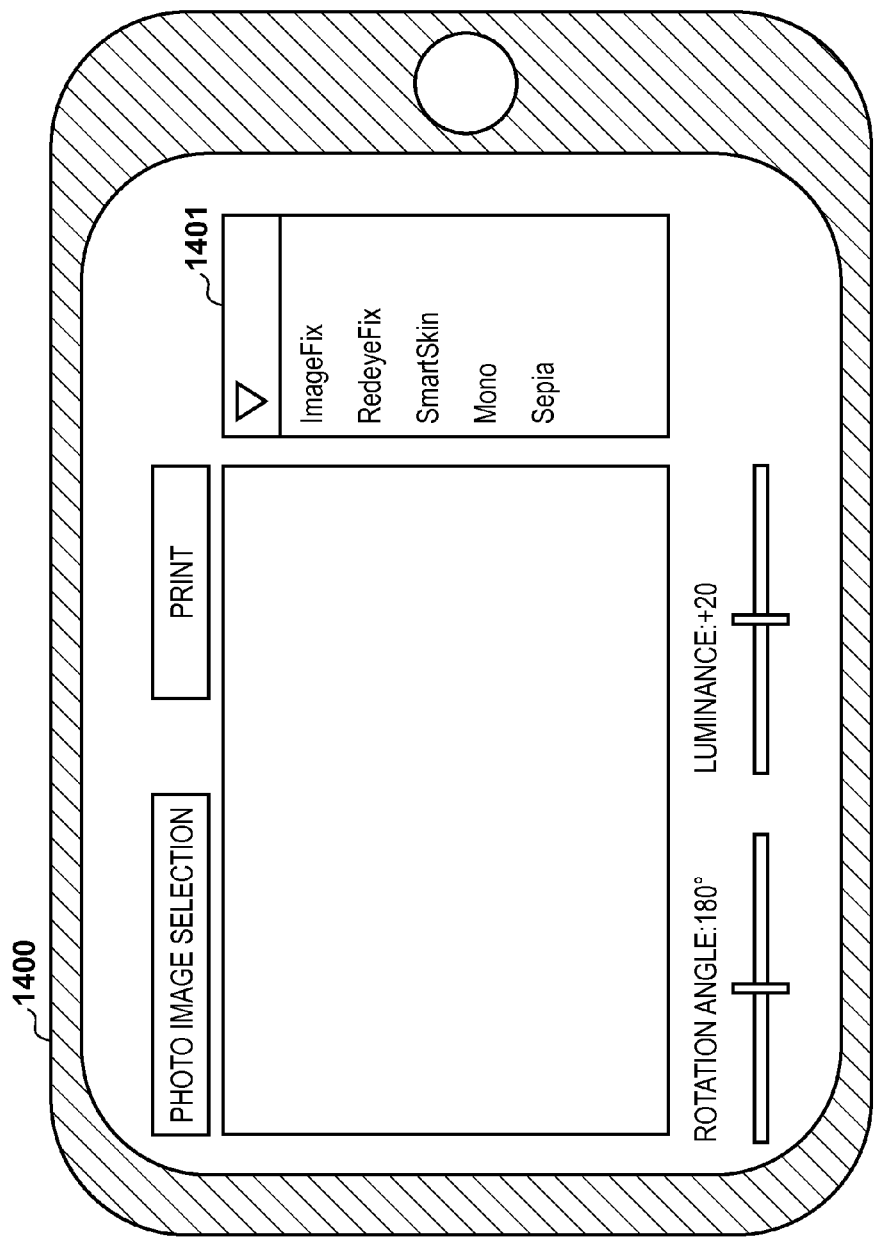
FIG. 14 is a view showing an example of a function selection screen.

In selection of an image processing function, in this embodiment, as shown in FIG. 14, a list of usable image processing functions is displayed in a function selection screen 1400 including a pull-down menu 1401, and then the user can select desired processing.

In the pull-down menu 1401, "ImageFix" indicates a function (face detection function) of automatically analyzing a photo image using a human face detection or scene analysis portion, and performing appropriate brightness/white balance adjustment (see Japanese Patent Laid-Open No. 2010-278708), "RedeyeFix" indicates a function (red eye detection function) of automatically detecting a red eye image from images and correcting it (see Japanese Patent Laid-Open No. 2006-350557), "SmartSkin" indicates a function of detecting a human face from a photo image, and preferably processing the skin region of the face (see Japanese Patent Laid-Open No. 2010-10938), "Mono" indicates a monochromatic processing function of performing a known monochrome transform, and "Sepia" indicates a sepia processing function of performing a known sepia transform. Note that the types of image processing functions are not limited to those shown in FIG. 14, and various kinds of image processing can be used in accordance with the application and purpose.

At this time, in this embodiment, a system function generally included in the OS layer 219 is called from JavaScript by using the binding function, and device attribute information as attribute information of the information processing apparatus 115 is acquired from the system function. The device attribute information is information about a terminal apparatus (information processing apparatus 115) of different performance on which an application operates and the operation state of the apparatus.

In this embodiment, the information processing apparatus 115 acquires, as device attribute information, a clock rate Clk [MHz] of the CPU 100 of itself. The information processing apparatus 115 then specifies an image processing group including usable image processing functions based on the clock rate Clk by using a predetermined threshold Th1. A virtual code for specifying an image processing group is given by:

```
If (Clk > Th1) ImageProcGrp = "A";
Else ImageProcGrp = "B"
```

Note that this determination processing is generally executed in the script layer 217 upon activation of an application. If an image processing group can be specified, a usable image processing display script is controlled in the script layer 217 by:

```
<form name="frmIProc">
  <select name="selIProc">
  </select>
</form>
<script type="text/javascript">
  Function fAddImageProc(Grp){
    var sObj=document.forms["frmIProc"].elements["selIProc"];
    if(Grp="A"){
      var idx=sObj.length;
      sObj.options[idx]=new Option("ImageFix");
      var idx=sObj.length;
      sObj.options[idx]=new Option("RedEyeFix");
      var idx=sObj.length;
      sObj.options[idx]=new Option("SmartSkin");
      var idx=sObj.length;
      sObj.options[idx]=new Option("Mono");
      var idx=sObj.length;
      sObj.options[idx]=new Option("Sepia");
    }
    Else if (Grp="B"){
      var idx=sObj.length;
      sObj.options[idx]=new Option("Mono");
      var idx=sObj.length;
      sObj.options[idx]=new Option("Sepia");
    }
  }
</script>
```

In the above script operation, if it is determined that the number of clocks of the CPU 100 of the information processing apparatus 115 is larger than a predetermined value (threshold) and complex image processing is executable (Grp=A), more image processing functions are selectable. On the other hand, if the number of clocks of the CPU 100 of the information processing apparatus 115 is equal to or smaller than the predetermined value, only low-load monochrome transform processing and sepia transform processing are selectable.

The above script is interpreted by the interpreter 214 shown in FIG. 2, and drawn as a function selection screen 1600 (FIG. 16) on the display 104. A pull-down menu 1601 of the function selection screen 1600 includes only Mono (monochrome transform) and Sepia (sepia transform) as optional image processing functions.

When the user selects a desired image processing function, it is possible to determine an image processing ID selected by using an HTML function. This image processing ID is transmitted to the native layer 218, and the image processing portion 208 shown in FIG. 2 applies image processing corresponding to the selected image processing function.

FIG. 16 shows an example in which image processes selectable by the user are narrowed down and displayed by excluding image processing inappropriate for the performance of the information processing apparatus 115. Note that a display method is not limited to this. For example, although image processing inappropriate for the performance of the information processing apparatus 115 is selectably displayed, a warning document or a display item such as a warning mark may be displayed to warn the user that the processing may be slowed down. The display item or warning document may be displayed before the user selects the image processing or displayed in response to a selection operation by the user.

Furthermore, if, for example, a program necessary for specific image processing is not installed, image processing unexecutable by the information processing apparatus 115 may be excluded from options for the user, and a warning may be given for image processing inappropriate for the information processing apparatus 115.

Furthermore, the image processing selection screen may be controlled in accordance with the status of the information processing apparatus 115 instead of the performance of the information processing apparatus 115. Alternatively, the selection screen may be controlled based on both the performance and status of the information processing apparatus 115. The status of the information processing apparatus 115 will be described later in the fifth embodiment.

Note that the performance or status of the information processing apparatus 115 is acquired when the user instructs to start selection of an image processing function. The performance of the information processing apparatus 115 may be acquired in advance before the instruction. However, as for the "status", newer information allows more appropriate display control. Therefore, the status of the information processing apparatus 115 is acquired at the start of selection of an image processing function.

<Details of Stamp Addition Processing>

Figure 12:
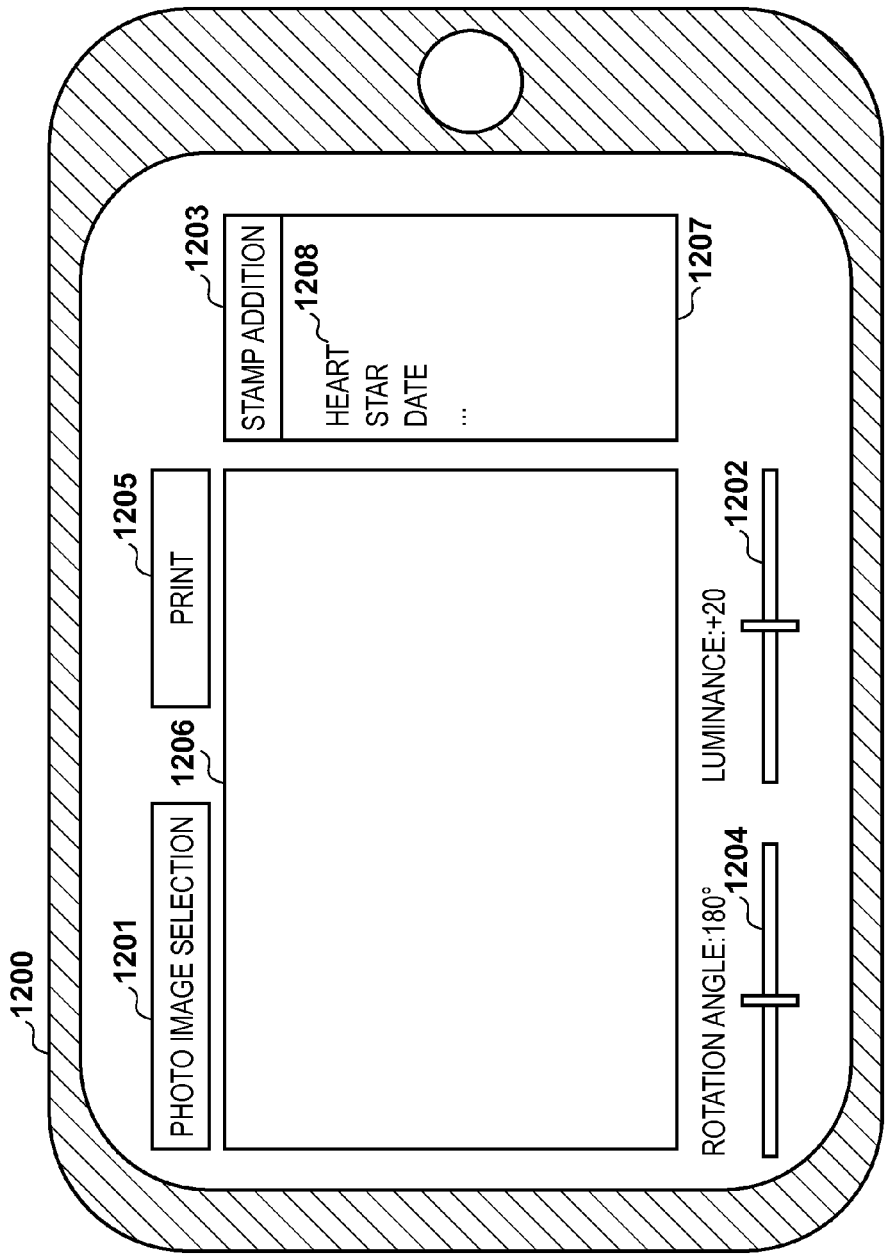
FIG. 12 is a view showing an example of an application screen.

Details of the stamp addition processing in step S23 of FIG. 3 will be described with reference to FIG. 6. In this example, a case in which a heart stamp 1208 is selected after the stamp addition button 1203 of the application screen 1200 shown in FIG. 12 is pressed by a user operation and the stamp list is displayed will be exemplified.

In step S501, in the script layer 217, the CPU 100 generates a unique ID. This ID has the same characteristic as that of the ID generated in step S301 of FIG. 3. In step S502, in the script layer 217, the CPU 100 transmits the access destination (absolute path) of an image to be used as a stamp to the native layer 218 together with the generated ID, thereby requesting to select the stamp image corresponding to the stamp.

In step S503, in the native layer 218, the CPU 100 acquires the stamp image using the absolute path of the stamp image received from the script layer 217 and a device-specific image selection API. In step S504, in the native layer 218, the CPU 100 rasterizes the acquired stamp image into an RGB image. In step S505, in the native layer 218, the CPU 100 holds the rasterized RGB image in the data holding portion 204 in association with the ID acquired from the script layer 217. An association method is the same as that in step S306 of FIG. 3. In step S506, in the native layer 218, the CPU 100 transforms the rasterized RGB image into data in a format interpretable in the script layer 217. In this transform processing, the CPU 100 transforms the RGB image into data in the JPEG format, similarly to step S307 of FIG. 3. In step S507, in the native layer 218, the CPU 100 transforms the data in the JPEG format into base64 data, and transmits the base64 data to the script layer 217.

In step S508, in the script layer 217, the CPU 100 receives the base64 data transformed in the native layer 218, and reserves a drawing area for displaying the base64 data in the RAM 102. In step S509, in the script layer 217, the CPU 100 generates and initializes an object parameter. Note that the object parameter is an object for holding parameters to be used, at the time of the rendering processing in step S27 of FIG. 3, to decide the rotation angle of the stamp after the rendering processing. An example of the object parameter held by JavaScript® is:

```
var ObjectParam = function( ){
    this.theta = 0;
    this.posX = 0;
    this.posY = 0;
    this.width = 100;
    this.height = 100;
}
```

This object parameter represents that a variable "theta" indicating the rotation angle is provided in an ObjectParam object and a value of 0 is stored in "theta". Similarly, "posX" represents an x-coordinate when the upper left corner of the drawing area is set as a reference point, "posY" represents a y-coordinate when the upper left corner of the drawing area is set as a reference point, "width" represents the lateral width of the drawing area, and "height" represents the longitudinal width of the drawing area. Note that the object parameter is minimized in this embodiment for the sake of simplicity. However, it is apparent that other parameters (translation amount, enlargement magnification, and the like) can be added and used at the time of drawing or rendering.

In step S510, in the script layer 217, the CPU 100 displays the base64 data as an image in the drawing area 1206 based on the generated object parameter. Note that one stamp is selected in this embodiment for the sake of simplicity. However, a plurality of stamps can be selected. In addition, an image prepared in advance is used as a stamp in this embodiment. However, a method of generating, in the script layer, an object to be drawn by using a Context object may be used.

<Details of Stamp Specifying Processing>

Figure 7:
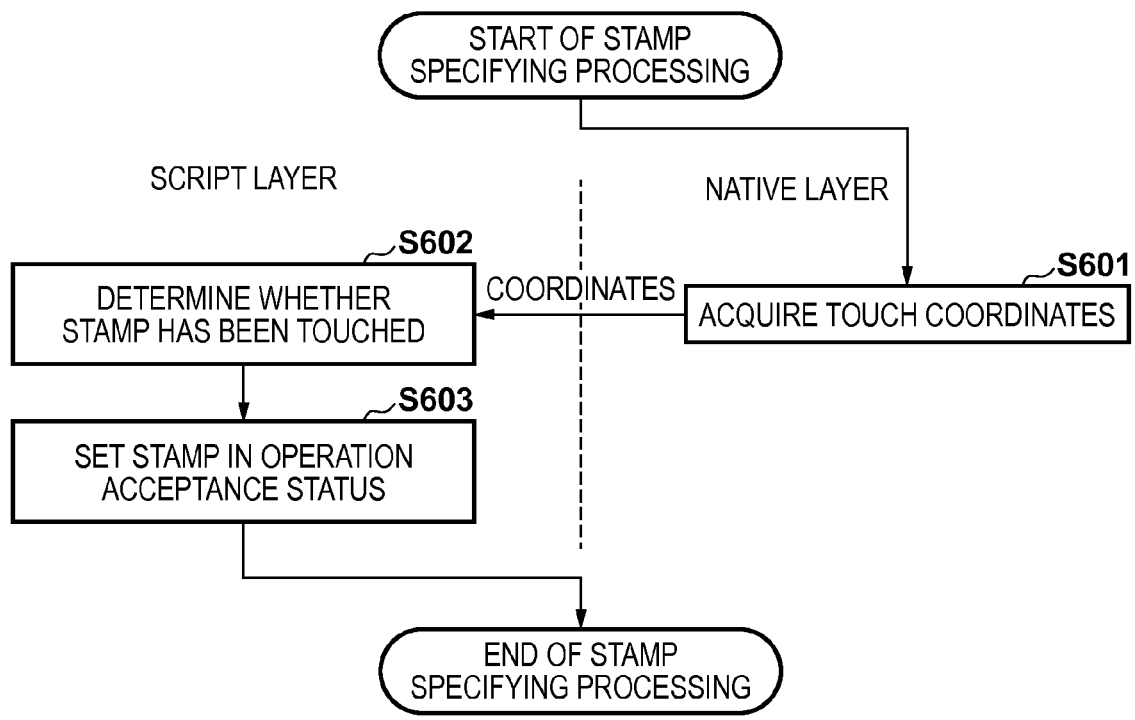
FIG. 7 is a flowchart illustrating details of stamp specifying processing.

Details of the stamp specifying processing in step S24 of FIG. 3 will be described with reference to FIG. 7.

In step S601, in the native layer 218, the CPU 100 acquires coordinates touched on the display 104, and transmits them to the script layer 217.

Figure 6:
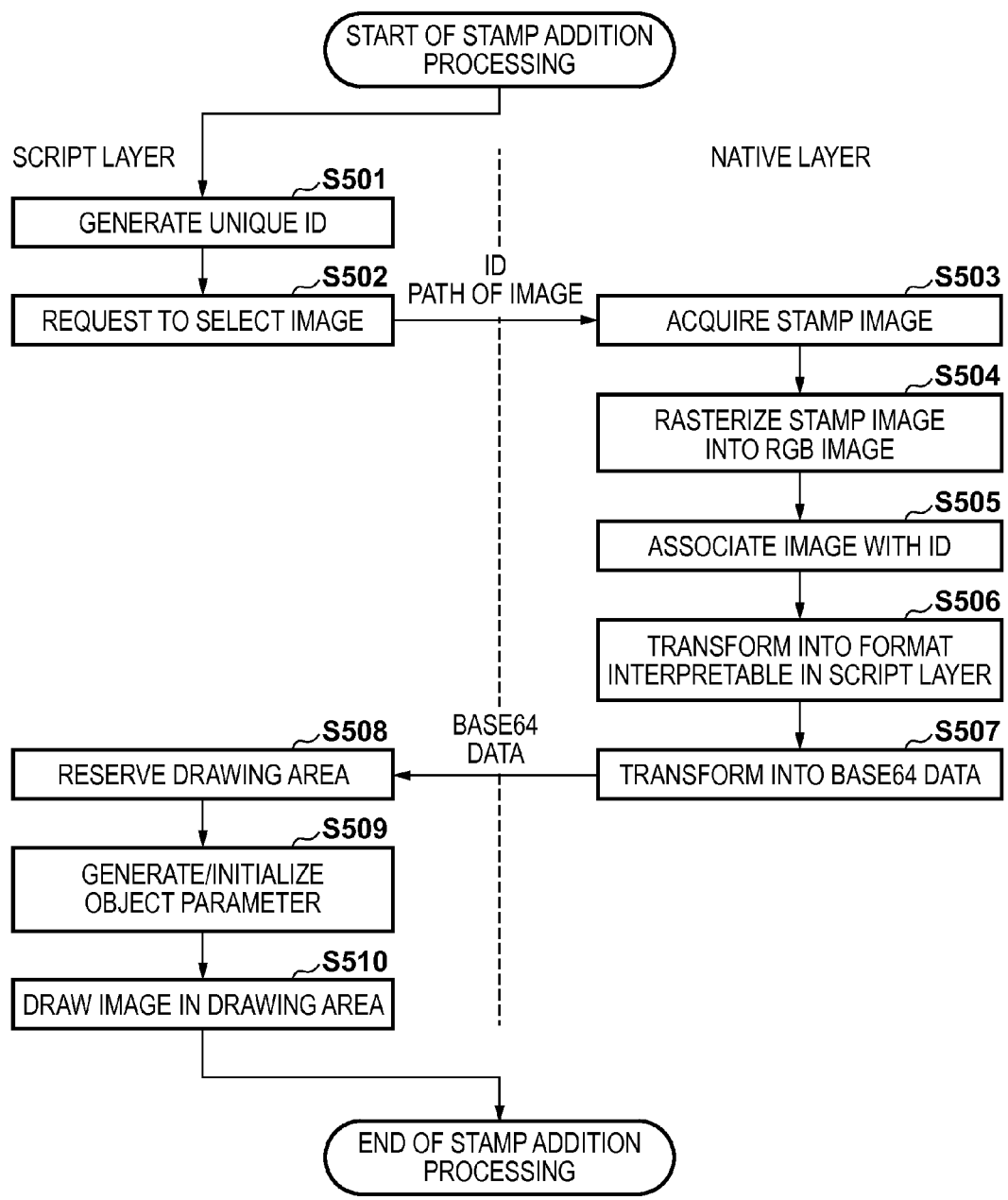
FIG. 6 is a flowchart illustrating details of stamp addition processing.

In step S602, in the script layer 217, the CPU 100 determines whether the stamp added in step S23 of FIG. 3 has been touched, based on the coordinates received from the native layer 218 and information of the object parameter generated in step S509 of FIG. 6. In the added stamp, the object parameter includes the initial values. Therefore, according to the above example of the object parameter, the stamp is drawn in an area of 100 in the x direction and 100 in the y direction with reference to (0, 0) set at the upper left corner of the drawing area 1206. If, therefore, a value obtained by subtracting the x-coordinate of the drawing area 1206 from the x-coordinate of the received coordinates (x, y) falls within the range from 0 to 100, and a value obtained by subtracting the y-coordinate of the drawing area 1206 from the y-coordinate of the received coordinates (x, y) falls within the range from 0 to 100, it can be determined that the stamp has been touched. If it is determined that the stamp has been touched, the stamp is set in the operation acceptance status. The following description will be provided by assuming that the stamp added in step S23 has been touched.

In step S603, in the script layer 217, the CPU 100 sets the stamp in the operation acceptance status in accordance with the determination result. Setting the stamp in the operation acceptance status is equivalent to temporarily recording the ID of the touched stamp as a stamp ID of interest in the script layer 217. Since images and IDs are stored in pairs in the data holding portion 204, if only an ID is grasped, it is possible to specify a unique image.

<Details of Stamp Operation Processing>

Figure 8:
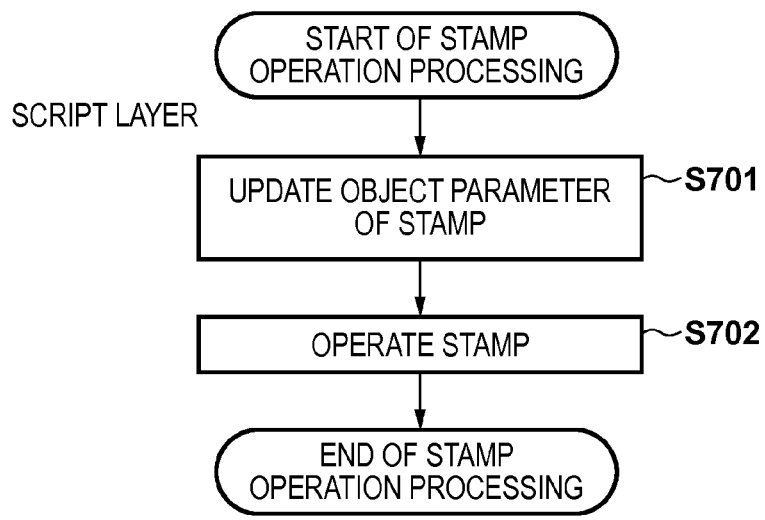
FIG. 8 is a flowchart illustrating details of stamp operation processing.

Details of the stamp operation processing in step S25 of FIG. 3 will be described with reference to FIG. 8.

In step S701, in the script layer 217, the CPU 100 updates the value of "rotate" of the object parameter of the stamp. For example, the CPU 100 updates the value by a value set using the slide bar 1204 of FIG. 12. In step S702, in the script layer 217, the CPU 100 re-draws the stamp set in the operation acceptance status in step S603 of FIG. 7 in the drawing area 1206 by using the object parameter. If, for example, the stamp image is drawn in an HTML canvas, it is possible to rotate the image in the canvas by using the rotate method of the Context object of the canvas.

Note that an operation of the stamp is only rotation in this embodiment. However, other operations such as enlargement/reduction and translation may be possible. It is also apparent that if a photo image has an object parameter, the same operation as the stamp operation is possible.

<Details of Printer Setting Processing>

Details of the printer setting processing in step S26 of FIG. 3 will be described with reference to FIG. 9.

In step S801, in the script layer 217, the CPU 100 requests the native layer 218 to acquire printer information as device information. This is equivalent to a request from the script layer 217 for communicating with the printer 112. As a request method, an API unique to the native layer is called from the script layer by using the binding function, similarly to the image selection processing. A function capable of being directly called from the script layer 217 or a so-called wrapper of indirectly calling the function is prepared in advance in the native layer 218. For example, a native function GetPrinterInfo is prepared, and called from the script side. In this way, the native layer acquires a request to communicate with an external device from the script layer.

In general, it is impossible to directly communicate with an external device from the script layer 217 under the security restrictions. Therefore, as described above, the script layer 217 requests the native layer 218 to acquire external device information, and then communicates with an external device via the native layer 218. The native layer 218 has a function of communicating with an external device (for example, the printer 112) via the OS layer 219.

In step S802, in the native layer 218, the CPU 100 calls a function for acquiring the printer information in accordance with the request from the script layer 217, and performs detection of a printer, that is, so-called discovery. As an example of a detection method, a printer connected via the same wireless LAN router is detected. In this example, since detection of a communicable printer is performed, the CPU 100 requests a response by a broadcast or multicast method by a protocol such as Bonjour, and stands by for a response from a printer, thereby detecting the printer.

In step S803, in the native layer 218, the CPU 100 stores an IP address included in the response from the printer 112. In step S804, in the native layer 218, the CPU 100 transmits a printer information acquisition command as a device information acquisition command to the printer 112 corresponding to the stored IP address. If there are a plurality of printers 112 which have responded, the CPU 100 transmits the printer information acquisition command to each of all the printers 112. The printer information acquisition command is an instruction to designate the operation of the printer, and its example is expressed in XML given by:

```
01:     <?xml version="1.0" encoding="utf-8" ?>
02:     <cmd xmlns:trans="http://www.xxxx/yyyyy/">
03:        <contents>
04:           <operation>GetCapability</operation>
05:        </contents>
06:     </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetCapability" is an instruction of acquiring information of a printer as an external device. For example, it is requested to provide capability information such as a paper type, a size, the presence/absence of a borderless print function, and the print quality supported by the printer.

Note that a printer information acquisition command may be generated by, for example, loading permanent text stored in advance in the ROM 101. Also, the format is not limited to the text format such as XML, and the command may be described in the binary format, and communicated by a protocol complying with the format. The generated printer information acquisition command is transmitted to the printer 112 via the printer communication portion 213 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
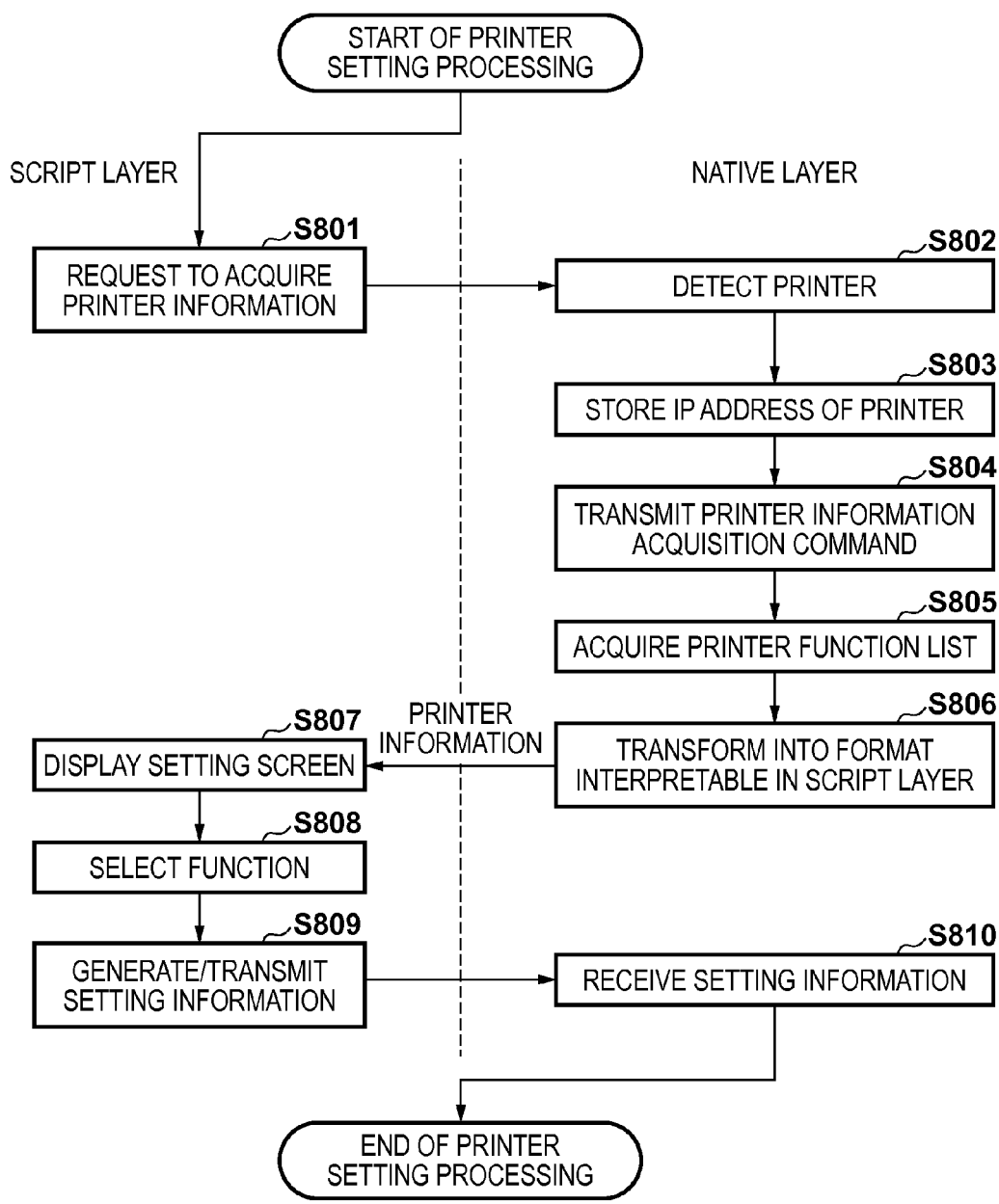
FIG. 9 is a flowchart illustrating details of stamp setting processing.

Referring to FIG. 9, a printer information acquisition command is generated in the native layer 218. However, even if a printer information acquisition command is generated in the script layer 217, it is possible to obtain the same effects. In this case, in the script layer 217, a printer information acquisition command including the above statement in the XML format is created in the script layer 217, and transferred to the native layer 218. Upon receiving the statement, the native layer 218 transmits the printer information acquisition command to the printer 112 in a format complying with a communication protocol.

Upon receiving the printer information acquisition command from the information processing apparatus 115, the printer 112 transmits the printer information as device information in the XML format to the information processing apparatus 115 according to the communication protocol. An example of the printer information is given by:

```
01:     <?xml version="1.0" encoding="utf-8" ?>
02:     <cmd xmlns:trans="http://www.xxxx/yyyyy/">
03:        <contents>
04:           <device id="Printer001" />
05:           <mode = 1>
06:              <media>GlossyPaper</media>
07:              <size>A4</size>
08:              <quality>1</quality>
09:              <border>no</border>
10:           </mode>
11:           <mode = 2>
               . . .
               </mode>
               <mode = 3>
               . . .
               </mode>
        </contents>
     </cmd>
```

The first line indicates a header representing that the information is described in the XML format.

On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>.

The fourth line indicates a device ID. In this example, the model name of the printer 112 is "Printer001".

On the fifth line and subsequent lines, the respective modes of the printer 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 11th line and subsequent lines, information about mode 2 as another mode is described. In this way, the model name of the printer 112 and all the modes supported by the printer are described in the XML data.

Note that a method of describing printer information is not limited to this. The printer information may be described in another format such as a binary format or a text format which is not a tag format.

In step S805, in the native layer 218, the CPU 100 receives the printer information from the printer 112. In the native layer, the CPU 100 acquires, from the received printer information, a printer function list including terms of the type and size of printing paper, the print quality, and bordered/borderless and a term count in each of all the modes of the printer 112.

In step S806, in the native layer 218, the CPU 100 transforms the received printer information into a format interpretable in the script layer 217, and transmits the transformed information to the script layer 217. That is, the information obtained by communication with the printer 112 is transferred to the script layer 217. More specifically, the native function is provided, and the binding function is used. The native function is called from the script layer 217, and the information is transferred as a return value. By setting a mode to be acquired or the like as an argument, the script layer 217 may receive the return value of the mode. As another example, there is a method of transmitting the received printer information in the XML format, or transmitting the printer information by transforming it in a text format without any tag. In addition, the information may be transferred by using the above-described JSON character string, or transferred by a character string such as base64 by using the data transforming portions 207 and 203.

In step S807, in the script layer 217, the CPU 100 forms a setting screen (FIG. 13) including functions usable by the printer 112 based on the printer information received from the native layer 218, and displays the setting screen. This is called display control in this embodiment. If there are a plurality of connectable printers, a display screen for displaying printer names and prompting the user to select a printer for printing is generated (display contents are controlled). Note that a printer selection method is not limited to this, and a method of selecting a printer which responds earliest, a method of selecting a printer having more functions, a method of selecting a printer with not so many print jobs, or the like may be used.

As described above, in the script layer 217, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
  <head>
    <title>print setting</title>
    <script>
      <!-- paper size -->
      var PaperSizeNum = GetPaperSizeNum( );
      var p = document.getElementById("PaperList");
      var i;
      for(i=0; i<PaperSizeNum; i++){
        p.options[i] = new Option(GetPaperSize(i),
GetPaperSize(i));
      }
      <!-- paper type -->
      var MediaTypeNum = GetMediaTypeNum( );
      var m = document.getElementById("MediaList");
      var j;
      for(j=0; j<MediaTypeNum; j++){
        m.options[i] = new Option(GetMediaType(j),
GetMediaType(j));
      }
      <!-- print quality -->
      var QualityNum = GetQualityNum( );
      var q = document.getElementById("QualityList");
      var k;
      for(k=0; k<QualityNum; k++){
        q.options[i] = new Option(GetQuality(k),
GetQuality(k));
      }
      <!-- bordered/borderless -->
      var BorderNum = GetBorderNum( );
      var b = document.getElementById("BorderList");
      var l;
      for(l=0; l<BorderNum; l++){
        b.options[i] = new Option(GetBorder(l),
GetBorder(l));
      }
      <!-- print function -->
      function printer( ) {
        SetPrint(document.getElementById("PaperList").value,
            document.getElementById("MediaList").value,
```

-continued

```
            document.getElementById("QualityList").value,
            document.getElementById("BorderList").value);
      }
    </script>
  </head>
  <!-- display portion -->
  <body>
    paper size <select id="PaperList"></select><br/>
    paper type <select id="MediaList"></select><br/>
    print quality <select id="QualityList"></select><br/>
    bordered/borderless <select id="BorderList"></select><br/>
    <br/>
    <button id="btn1" onclick="printer( )">setting completion</button>
  </body>
</html>
```

In the above sample, GetPaperSizeNum( ), GetMediaTypeNum( ), GetQualityNum( ), and GetBorderNum( ) are native functions, and each native function has a function of acquiring an item count. For example, paper sizes supported by the printer are A4, A5, B5, and L size, GetPaperSizeNum( ) returns 4.

Also, GetPaperSize(n), GetMediaType(n), GetQuality(n), and GetBorder(n) are native functions, and each function returns the nth character string. For example, the return value of GetPaperSize(0) as a function of returning text of the paper size is "A4", and the return value of GetPaperSize(1) is "A5". These values are extracted by the native function from the printer information received from the printer.

Note that as an example, the paper size, paper type, print quality, and bordered/borderless settings are made. The present invention, however, is not limited to this. As another example, other setting items such as double-sided/single-sided, color/monochrome, and ON/OFF of image correction are set. Furthermore, not only the print function but also information about image processing and analysis processing processable by the printer, the presence/absence of a silent mode, the presence/absence of the use of a memory card, and a status such as the remaining ink amount may be displayed.

Figure 13:
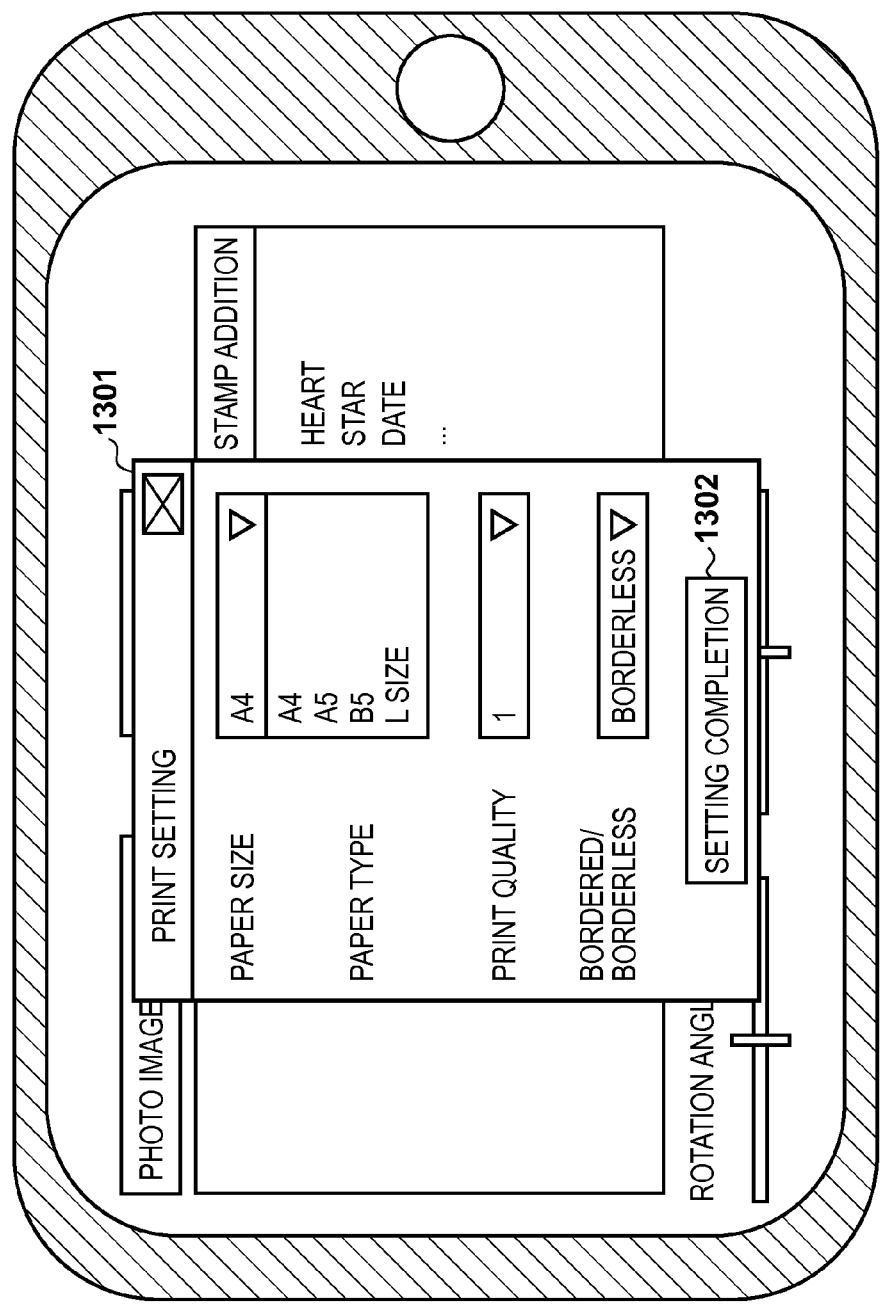
FIG. 13 is a view showing an example of a setting screen.

In step S808, in the script layer 217, the CPU 100 selects a function to be set in the printer based on a user operation on the setting screen 1301. The setting screen 1301 shown in FIG. 13 is an example in which the HTML description of the above example is rendered using the rendering portion 216, and displayed on the display 104. The printer information is requested via the native layer 218, thereby forming the setting screen 1301 based on the information acquired from the printer information by using the above native function.

Note that the HTML description has been explained to be formed in the script layer 217. However, the present invention is not limited to this. For example, an HTML description may be formed in the native layer 218, rendered in the script layer 217, and displayed on the display 104.

Furthermore, each setting item such as the paper size of the setting screen 1301 is provided as a pull-down menu, and can be selected by a user operation. The setting screen 1301 indicates a state in which a list of selectable items is displayed as a setting item of a paper size by a pull-down menu, and a paper size such as A4 or A5 can be selected by a user operation.

In step S809, in the script layer 217, upon detecting a user operation on the setting completion button 1302, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer the paper size, paper type, print quality, and bordered/borderless settings as a character string to the native layer 218.

In step S810, in the native layer 218, the CPU 100 receives the setting information from the script layer 217 by the binding function. In the native layer 218, a print command is generated based on the received setting information according to the communication protocol of the printer 112, and transmitted to the printer 112 via the printer communication portion 213.

Note that in selection of an image processing function, contents of the image processing function selection screen are changed according to the performance or status of the information processing apparatus 115 such as the number of clocks of the CPU 100, as described above. When displaying the image processing function selection screen, contents of the image processing functions may be changed according to the function of the printer in addition to the performance or status of the information processing apparatus 115. In this case, the function of the printer is acquired by the same method as in the processing shown in FIG. 9. Then, contents of the image processing function selection screen may be changed according to only the function of the printer or a combination of the function of the printer and the performance or status of the information processing apparatus 115.

For example, even if an image processing function is executable in terms of the performance of the information processing apparatus 115, it may be inappropriate for the function of the printer. For example, an image processing function for color printing may be inappropriate for a monochrome printer having no color print function. In this case, based on the above combination, display control is performed not to select image processing for color printing.

If the processing load of image processing to be executed by the terminal apparatus according to the function of the printer is heavy, and the processing performance of the information processing apparatus 115 is low or another program is operating, this image processing may be inappropriate. In this case, display of the image processing selection screen is controlled to prevent the user from selecting the image processing.

<Details of Rendering Processing>

Figure 10:
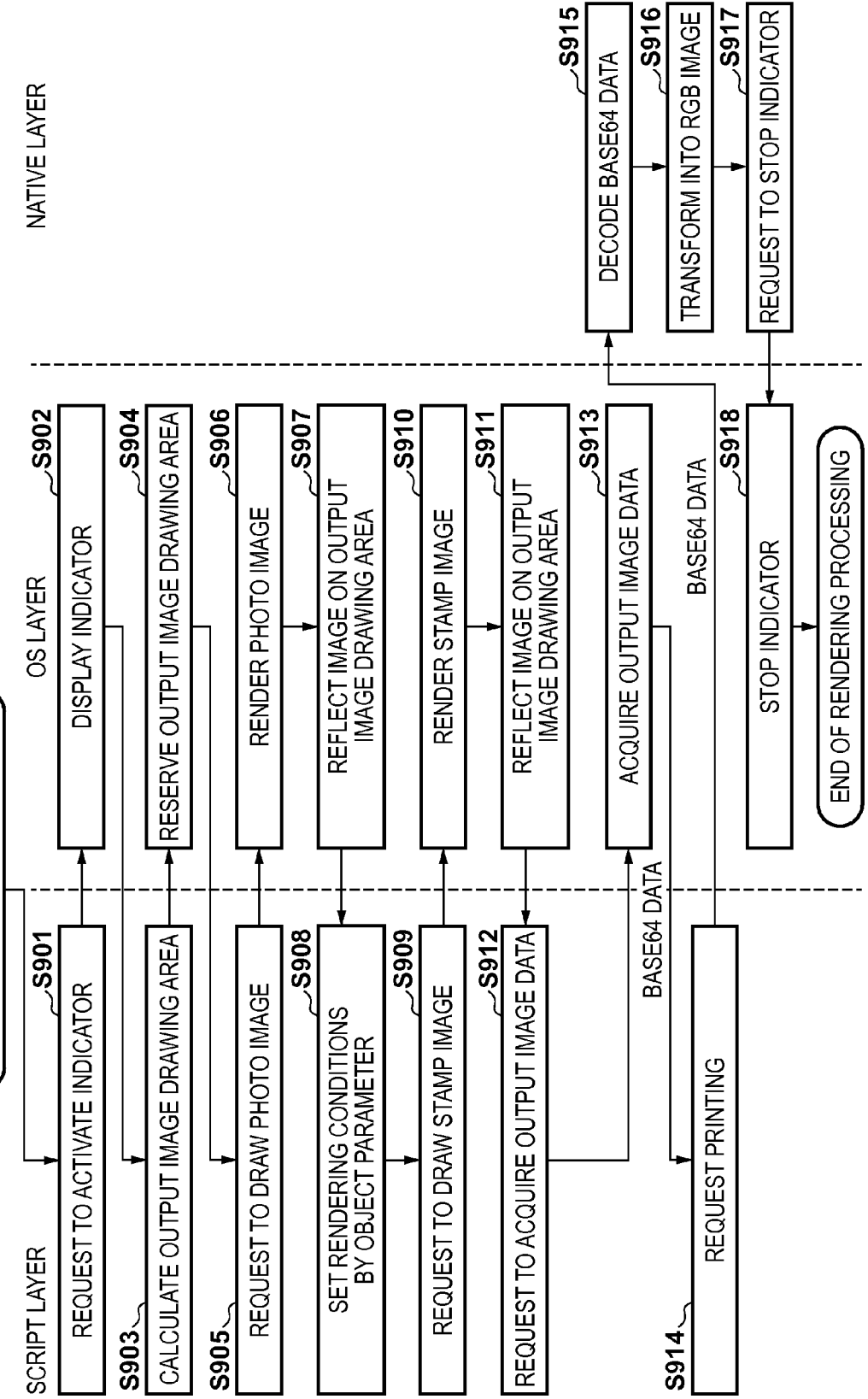
FIG. 10 is a flowchart illustrating details of rendering processing.

Details of the rendering processing in step S27 of FIG. 3 will be described with reference to FIG. 10.

In step S901, in the script layer 217, the CPU 100 requests the OS layer 219 to activate an indicator.

In step S902, in the OS layer 219, the CPU 100 displays, on the display 104, the indicator activated by the request.

In step S903, in the script layer 217, the CPU 100 decides an output size corresponding to the paper size set in the setting information generated in step S809, and calculates an output image drawing area.

In step S904, in the OS layer 219, the CPU 100 reserves the calculated output image drawing area in the RAM 102.

In step S905, in the script layer 217, the CPU 100 requests the OS layer 219 to draw a photo image.

In step S906, in the OS layer 219, the CPU 100 interprets the script of the request to draw the photo image, and renders the photo image. After that, in step S907, the CPU 100 reflects the rendered photo image on the drawing area reserved in step S904. The reflecting operation is equivalent to not displaying an image on the display 104 but making a change to the drawing area.

In step S908, in the script layer 217, the CPU 100 describes and sets, in a script, a change in rendering conditions by an object parameter before requesting to draw a stamp image. In step S909, in the script layer 217, the CPU 100 requests the OS layer 219 to draw the stamp image.

In step S910, in the OS layer 219, the CPU 100 renders the stamp image under the rendering conditions. That is, rotation processing or resizing of the image is executed in the OS layer. After the end of rendering, the rendered stamp image is reflected, in step S911, on the drawing area reserved in step S904.

In step S912, in the script layer 217, the CPU 100 requests the OS layer 219 to acquire output image data.

In step S913, in the OS layer 219, the CPU 100 transforms the image data existing in the drawing area into base64 data, and transmits the base64 data to the script layer 217.

In step S914, in the script layer 217, the CPU 100 transmits the base64 data received from the OS layer 219 to the native layer 218, and requests the native layer 218 to print the data.

In step S915, in the native layer 218, the CPU 100 decodes the base64 data received from the script layer 217. In step S916, in the native layer 218, the CPU 100 transforms the base64 data into an RGB image. In step S917, in the native layer 218, the CPU 100 requests the OS layer 219 to stop the indicator.

In step S918, in the OS layer 219, the CPU 100 stops the indicator, and removes the indicator displayed on the display 104.

<Details of Print Processing>

Figure 11:
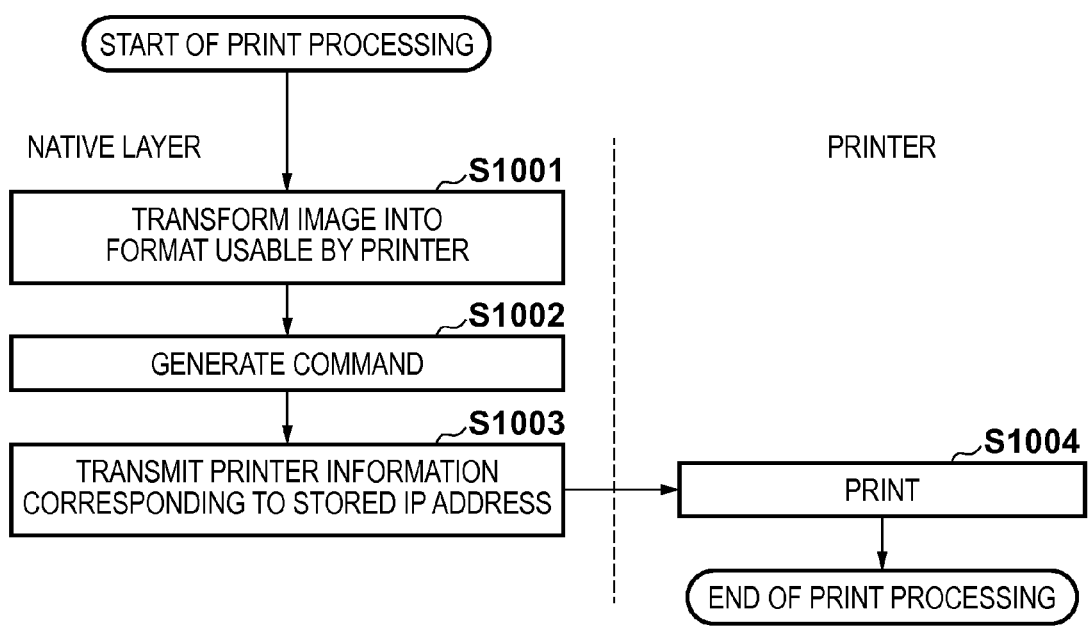
FIG. 11 is a flowchart illustrating details of print processing.

Details of the print processing in step S28 of FIG. 3 will be described with reference to FIG. 11.

In step S1001, in the native layer 218, the CPU 100 transforms the RGB image transformed in step S916 into a format usable by the printer 112 based on the setting information created in step S809. The format usable by the printer is image data in a printer vender-specific format such as RGB, JPEG, CMYK, or PDF. In step S1002, in the native layer 218, the CPU 100 generates a command to be transmitted to the printer 112 based on the setting information and the image transformed in step S1001. In step S1003, in the native layer 218, the CPU 100 uses the printer communication portion 213 to transmit the command generated in step S1002 to the printer 112 corresponding to the IP address stored in step S803 in accordance with the communication protocol usable by the printer.

In step S1004, the printer 112 executes printing according to the command received from the information processing apparatus 115.

As described above, according to this embodiment, image data can be exchanged between the script layer and the native layer. Many OSs normally include a function capable of interpreting JavaScript. This can provide an application to the users of many OSs by developing it once without considering a difference in native language. In addition, it is possible to use the native layer advantageous in terms of the execution speed, thereby improving the usability. Also, the native layer can be implemented without communicating with an external server, thereby allowing an offline operation.

Second Embodiment

In the first embodiment, the script of the UI of the image processing functions is controlled using the number of clocks of the CPU 100 and the threshold. The present invention, however, is not limited to this. In a script layer 217, for example, information indicating the relationship between an image processing function and the number of clocks of a CPU 100 capable of executing the image processing function may be held in advance, as shown in table 1 below.

TABLE 1

| image processing function | executable number ICLK[i] [MHz] of clocks |
|---|---|
| ImageFix | 1500 |
| RedeyeFix | 1000 |
| SmartSkin | 1500 |
| Mono | 500 |
| Sepia | 500 |

Table 1 shows each image processing function and the lower limit of the number of clocks of the CPU 100 capable of executing the image processing function without any stress. By comparing, with each threshold, the number Clk of clocks of the CPU 100 acquired from the system function of an OS layer 219, it is possible to control the script of the UI of the image processing functions so as to be able to select only image processing functions which satisfy:

$$Clk < ICLK[i]$$

As described above, according to this embodiment, it is possible to more dynamically implement UI display corresponding to "device attribute information" about the CPU speed (the number of clocks). This can more appropriately present usable image processing to the user in accordance with the device performance. As a result, it is possible to suppress inconvenience of executing complex image processing on a low-performance device to significantly impair the usability.

In this embodiment, only the number of clocks has been exemplified as the CPU performance associated with the processing speed. However, as the CPU performance influencing the processing speed, there are the type of the CPU and the number of cores in addition to the speed of the CPU. Usable image processing may be decided for one or a combination of some of these factors. Controlling usable image processing based on a combination of some of these factors is more advantageous in providing an image processing environment more appropriate for each actual user, as compared with a case in which usable image processing is controlled based on one factor.

Third Embodiment

In each of the aforementioned embodiments, only the number of clocks of the CPU has been explained. The present invention, however, is not limited to this. For example, a script layer 217 can acquire a memory capacity Ram [MBytes] from the system function of an OS layer 219 by using the binding function, and then control the scrip of the UI of image processing functions according to a usable memory size of the memory capacity. In this embodiment, in the script layer 217, for example, information indicating the relationship between an image processing function and a (usable) memory size capable of executing the image processing function is held in advance, as shown in Table 2 below. The memory size is, for example, a memory size which can be reserved in a RAM 102. If, however, a swap area can be increased in a secondary storage device 103 by using a swap function, a memory size reserved in the swap area is also taken into consideration.

TABLE 2

| image processing function | executable memory size IRAM[i] [MBytes] |
|---|---|
| ImageFix | 200 |
| RedeyeFix | 100 |
| SmartSkin | 500 |
| Mono | 50 |
| Sepia 50 | 50 |

Table 2 shows each image processing function and the lower limit of the memory size for executing the image processing function without any stress. By comparing, with each threshold, the memory capacity Ram acquired from the system function of the OS layer 219, it is possible to control the script of the UI of the image processing functions so as to be able to select only image processing functions which satisfy:

$$Ram < IRAM[i]$$

As described above, according to this embodiment, it is possible to more appropriately present usable image processing to the user in accordance with "device attribute information" about the usable memory size. It is possible to prevent a situation in which the user selects image processing requiring a large memory size on a device having a small usable memory size (or incorporating a small-size memory) and the processing cannot be performed due to memory shortage.

Fourth Embodiment

In the fourth embodiment, a case in which the scrip of the UI of image processing functions is controlled in accordance with the device temperature of a device on which an application operates will be described. When an information processing apparatus 115 is used, if processing with a heavy processing load is executed, the CPU may generate heat. It is, therefore, important to suppress an increase in device temperature.

In this embodiment, in a script layer 217, for example, an image processing function and a device temperature capable of executing the image processing function are held in advance, as shown in table 3 below.

TABLE 3

| image processing function | executable device temperature IDEG[i] [° C.] |
|---|---|
| ImageFix | 20 |
| RedeyeFix | 20 |
| SmartSkin | 20 |
| Mono | 36 |
| Sepia | 36 |

Table 3 shows each image processing function and the upper limit of an appropriate device temperature. By comparing, with each threshold, a device temperature Deg of the device (information processing apparatus 115) acquired from the system function of an OS layer 219, it is possible to control the script of the UI of the image processing functions so as to be able to select only image processing functions which satisfy:

$$Deg > IDEG[i]$$

As described above, according to this embodiment, it is possible to dynamically control the script of the UI of the image processing functions in accordance with "device attribute information" about the device temperature. It is possible to prevent the use of image processing with a heavier load when the temperature of the device is originally high.

Fifth Embodiment

In each of the aforementioned embodiments, various tables and thresholds described in each embodiment are held in advance in the script layer 217 of the application. The present invention, however, is not limited to this. For example, data such as tables and thresholds may be held in a server 114 shown in FIG. 1, and acquired using a network 113 upon activation of an application.

As in the aforementioned embodiments, "device attribute information" includes "performance for each terminal apparatus" and "the operation state of the terminal apparatus". As the former "performance for each terminal apparatus", the number of clocks of the CPU and the memory size have been exemplified. As the latter "the operation state of the terminal apparatus", the device temperature has been exemplified. The script of the UI of the image processing functions is controlled by using each of these kinds of device attribute information. The present invention, however, is not limited to this.

Other examples of "device attribute information" about "the performance for each terminal apparatus" are:
  display performance (pixel count, size, monochrome/color, and the like)
  battery capacity
  presence/absence and type of communication function For image processing of correcting part of an image, such as red eye correction or skin retouch, it is desired to execute printing after the correction result is displayed once and the correction effect is confirmed. In such image processing, it may be impossible to sufficiently confirm the correction effect on the screen depending on the "display performance", for example, when the display size is small, the resolution is low, or the display is a monochrome display. To cope with this, it is possible to improve the usability by limiting selectable image processing functions by the script of the UI according to the "display performance".

Furthermore, image processing of implementing "automatic layout printing" of performing collage printing or album printing by automatically extracting necessary images from a large number of images has been recently proposed. In such image processing, it is necessary to analyze a large number of images. Therefore, if a device having a low battery capacity performs such image processing, the battery may go dead during image analysis before printing, thereby impairing the usability. To cope with this, it is possible to ensure the usability by controlling, by the script of the UI in accordance with the "battery capacity", whether to allow selection of "automatic layout printing".

In image processing such as "automatic layout printing" requiring analysis of a large number of images, the analysis time becomes long depending on the number of images. A device having the voice communication function cannot perform voice communication even if an incoming call is received during image analysis, thereby impairing the usability. Consequently, it is possible to ensure the usability by controlling, by the script of the UI in accordance with the "type of communication function", whether to allow selection of the automatic layout print function.

On the other hand, other examples of "device attribute information" about "the operation state of the terminal apparatus" are:
  battery level
  charging status (whether the apparatus is in a charging status or not)
  connection status (whether the apparatus is connected to a public network or not)
  operation status (whether the apparatus is performing processing in parallel to another service or program)

As for the above-described image processing such as "automatic layout printing" requiring analysis of a large number of images, if the battery capacity is sufficient high but the actual battery level is low, the battery may go dead during image analysis, thereby impairing the usability. To cope with this, it is possible to ensure the usability by controlling, by the script of the UI in accordance with the "battery level", whether to allow selection of "automatic layout printing".

Similarly, even if the battery capacity or battery level is low, if the apparatus is in the "charging status", image processing requiring time like "automatic layout printing" can be executed without any problem. Consequently, in the "charging status", it is possible to ensure the usability by controlling, by the script of the UI, to allow "automatic layout printing".

In recent years, there is also a print service of performing image processing on the server side on a network instead of a terminal apparatus, transforming data into print data, and directly transmitting the print data to a printer or temporarily transmitting the print data to the terminal apparatus and then transmitting the print data from the terminal apparatus to the printer. In this print service, since image processing is performed via a public network, it is essential to connect to the public network. Therefore, only if the apparatus is "connected to the public network", the script of the UI is used to control to allow such image processing. This can prevent image processing, which cannot be implemented when the apparatus is not connected to the network, from being displayed on the UI, thereby ensuring the usability.

In recent terminal apparatuses, multitasking is the mainstream. In fact, programs different from those mainly presented to the user on the screen are often processed in parallel. In this case, image processing may be slowed down while the programs are processed, as compared with a case in which the image processing is performed singly, thereby impairing the usability. To cope with this, if a plurality of programs are active in parallel, it is possible to limit selectable image processing functions by the script of the UI. As a result, it is possible to suppress a decrease in usability.

In addition, the script of the UI of the image processing functions can be controlled by using information obtained by combining a plurality of pieces of "device attribute information" described above. The script of the UI of the image processing functions can be controlled by using at least one of "the performance for each terminal apparatus" and "the operation state of the terminal apparatus" among the pieces of "device attribute information".

A case in which the image processing groups described in each of the aforementioned embodiments are held in advance in the printer main body has been explained. The present invention, however, is not limited to this. For example, data of image processing groups may be saved in the server 114 shown in FIG. 1. The data of the image processing groups can be acquired using the standard communication function of the Internet upon activation of an application, or the data of the image processing groups can be included in advance in an application.

In each of the aforementioned embodiments, the arrangement of controlling the script of the UI of the image processing functions based on the device attribute information has been explained. The present invention, however, is not limited to this. For example, the script of the UI of the image processing functions can be controlled using attribute information obtained by combining one or some of pieces of attribute information such as the function, genre, and use purpose of the printer 112 as an external device connected to the information processing apparatus.

In each of the aforementioned embodiments, the UI of the image processing functions is controlled. The present invention, however, is not limited to this. For example, the UI of functions other than the image processing functions of an external device to be used can be controlled in accordance with device information of the external device.

Sixth Embodiment

In each of the aforementioned embodiments, a case in which a hybrid application is operated on a portable information terminal as the information processing apparatus 115 has been exemplified. The present invention, however, is not limited to this. For example, as an environment in which the hybrid application operates, in addition to information terminals represented by a smartphone and table PC, other electronic apparatuses such as a PC, server, game machine, and digital camera are possible.

In addition, in each of the aforementioned embodiments, the printer has been exemplified as an external device. The present invention, however, is not limited to this. For example, another electronic apparatus capable of providing information about itself, such as another smartphone, tablet PC, PC, server, game machine, or scanner, may be used as an external device. For example, it is possible to acquire, from the script layer, information about the electronic apparatus such as the function of the electronic apparatus like the battery level, communication status, wireless LAN connection presence/absence, GPS, temperature, humidity, and acceleration of another portable information terminal.

Examples of an external device are an electric appliance and car. For example, it is possible to acquire information of an electronic apparatus such as an external refrigerator, washing machine, air conditioner, lighting, vacuum cleaner, or thermo pot from the script layer on the portable information terminal, and adjust ON/OFF and output of the function of the electronic apparatus.

Furthermore, in each of the aforementioned embodiments, as a method of drawing contents (a photo image or stamp image), the canvas function of JavaScript has been exemplified. A method of drawing contents is not limited to this. For example, it is possible to draw contents using SVG (Scalable Vector Graphics).

In addition, as the printer according to each of the aforementioned embodiments, an inkjet printer, a laser printer, a dye-sublimation printer, a dot impact printer, or the like can be used. These printers may be so-called multi-function peripherals having not a single function but the printer function, the scanner function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122752 filed Jun. 13, 2014 which is hereby incorporated by reference herein in its entirety.

What is claimed is:

1. A method, executed by at least one processor of an apparatus, comprising steps of:
    storing a program including a first program layer with an instruction set to be interpreted and executed by the at least one processor and a second program layer with an instruction set compiled in advance by a unit other than the at least one processor;
    acquiring at least one of information about the apparatus and information about an external device connected to the apparatus; and
    controlling, based on at least one of the information about the apparatus and the information about the external device acquired in the acquiring step, display contents of a display screen for using a function performed by the at least one processor by executing the program, which are displayed in the first program layer of the program.

2. The method according to claim 1, wherein, based on information about the at least one processor as information about the apparatus, the display control step controls the display contents of the display screen for using the function.

3. The method according to claim 1, further comprising a step of selecting, in the first program layer, an image to be processed,
    wherein based on at least one of the information about the apparatus and the information about an external device connected to the apparatus acquired in the acquiring step, controlling, in the controlling step, the display contents of the display screen including an image processing function usable for the image to be processed.

4. The method according to claim 1, wherein the first program layer is described in a Web standard language.

5. The method according to claim 1, wherein, at least one of the information about the apparatus via the second program layer is acquired in the acquiring step, and the display contents of the display screen for using the function are controlled, in the controlling step, in the first program layer based on the acquired information about the apparatus.

6. The method according to claim 1, wherein the external apparatus is a printer, and information about a function of the printer is acquired in the acquiring step.

7. The method according to claim 1, wherein the information about the apparatus includes at least one of information about performance of the apparatus and information about a status of the apparatus.

8. The method according to claim 7, wherein the information about the performance of the apparatus includes at least one of performance of the at least one processor, a memory capacity, a battery capacity, and the presence/absence of a communication function.

9. The method according to claim 7, wherein the information about the status of the apparatus includes at least one of a battery level, a charging status, a connection status to a public network, and an operation status of another program.

10. The method according to claim 1, wherein the controlling is executed based on a combination of the information about the apparatus and the information about the external device connected to the apparatus.

11. The method according to claim 1, wherein the function is an image processing function.

12. The method according to claim 11, wherein the image processing function includes at least one of a human face detection function, a red eye detection function, an automatic layout print function, a monochromatic processing function, and a sepia processing function.

13. The method according to claim 11, wherein the image processing function is performed in the second program layer.

14. The method according to claim 1, wherein information about the apparatus is held in at least one of the apparatus, an external apparatus connected to the apparatus via a network, and the first program layer.

15. The method according to claim 1, wherein the function is a function used by the apparatus to cause a printing apparatus to print an image.

16. The method according to claim 1, wherein the display control step executes the control in the second program layer.

17. The method according to claim 16, wherein in the second program layer, the display control step controls the display contents by transforming information about the apparatus into data in a format interpretable in the first program layer, and transmitting the data to the first program layer.

18. A non-transitory computer-readable storage medium storing a program that when executed causes a computer to perform a method comprising steps of:

storing a program including a first program layer with an instruction set to be interpreted and executed by the at least one processor and a second program layer with an instruction set compiled in advance by a unit other than the at least one processor;

acquiring at least one of information about the apparatus and information about an external device connected to the apparatus; and controlling, based on at least one of the information about the apparatus and the information about the external device acquired in the acquiring step, display contents of a display screen for using a function performed by the at least one processor by executing the program, which are displayed in the first program layer of the program.

19. An apparatus, comprising:

at least one processor, and a memory configured to store a program including a first program layer with an instruction set to be interpreted and executed by the at least one processor and a second program layer with an instruction set compiled in advance by a unit other than the at least one processor, wherein the at least one processor controls, based on at least one of information about the apparatus and information about an external device connected to the apparatus, display contents of a display screen for using a function performed by the at least one processor by executing the program, which are displayed in the first program layer of the program.

* * * * *